(12) United States Patent
Park et al.

(10) Patent No.: US 10,341,149 B2
(45) Date of Patent: Jul. 2, 2019

(54) APPARATUS, SYSTEM AND METHOD OF COMMUNICATING A WAKEUP PACKET

(71) Applicant: INTEL CORPORATION, Santa Clara, CA (US)

(72) Inventors: Minyoung Park, Portland, OR (US); Shahrnaz Azizi, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/574,246

(22) PCT Filed: Mar. 31, 2016

(86) PCT No.: PCT/US2016/025142
§ 371 (c)(1),
(2) Date: Nov. 15, 2017

(87) PCT Pub. No.: WO2016/186738
PCT Pub. Date: Nov. 24, 2016

(65) Prior Publication Data
US 2018/0176053 A1 Jun. 21, 2018

Related U.S. Application Data

(63) Continuation-in-part of application No. 14/864,952, filed on Sep. 25, 2015, now Pat. No. 9,485,733.
(Continued)

(51) Int. Cl.
*H04L 27/04* (2006.01)
*G06F 1/3209* (2019.01)
(Continued)

(52) U.S. Cl.
CPC ............ *H04L 27/04* (2013.01); *G06F 1/3209* (2013.01); *H04L 12/12* (2013.01); *H04L 27/06* (2013.01);
(Continued)

(58) Field of Classification Search
CPC ......... H04L 27/04; H04L 12/12; H04L 27/06; H04L 5/0007; H04L 27/0008; H04W 52/0229
(Continued)

(56) References Cited

U.S. PATENT DOCUMENTS 9,485,733 B1 11/2016 Park et al.
9,848,385 B2 12/2017 Park et al.
(Continued)

FOREIGN PATENT DOCUMENTS

| EP | 2680522 | 1/2014 |
|---|---|---|
| WO | 02061957 | 8/2002 |

(Continued)

OTHER PUBLICATIONS

International Preliminary Report on Patentability for PCT/US2016/025142, dated Nov. 30, 2017, 10 pages.
(Continued)

*Primary Examiner* — Michael R Neff
(74) *Attorney, Agent, or Firm* — Shichrur & Co.

(57) ABSTRACT

For example, an apparatus may include one or more processors comprising circuitry to cause a first wireless device to generate a wakeup packet comprising a payload first wireless device to generate a wakeup packet comprising a payload comprising at least one payload field modulated according to an On-Off keying (OOK) modulation, the payload field comprising a sequence of a plurality of codes to encode binary bit values of the payload field according to an encoding scheme having a code rate less than one, a first code of the encoding scheme representing a binary bit value of "0" comprising a first sequence of two or more bits comprising at least one bit having a value of "1", and a second code of the encoding scheme representing a binary bit value of "1" comprising a second sequence of two or
(Continued)

more bits comprising at least one bit having a value of "1"; and to transmit the wakeup packet to a second wireless device.

24 Claims, 8 Drawing Sheets

Related U.S. Application Data

(60) Provisional application No. 62/252,690, filed on Nov. 9, 2015, provisional application No. 62/162,766, filed on May 17, 2015.

(51) Int. Cl.
*H04L 27/06* (2006.01)
*H04L 12/12* (2006.01)
*H04W 52/02* (2009.01)
*H04L 27/00* (2006.01)
*H04L 5/00* (2006.01)

(52) U.S. Cl.
CPC ....... *H04W 52/0229* (2013.01); *H04L 5/0007* (2013.01); *H04L 27/0008* (2013.01); *Y02D 70/00* (2018.01); *Y02D 70/1224* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/20* (2018.01); *Y02D 70/22* (2018.01); *Y02D 70/26* (2018.01)

(58) Field of Classification Search
USPC ........................................................ 375/300
See application file for complete search history.

(56) References Cited

U.S. PATENT DOCUMENTS

| | | | |
|---|---|---|---|
| 2007/0053462 A1 | 3/2007 | Pirooz et al. | |
| 2008/0112491 A1* | 5/2008 | Shaanan | H03M 13/03 375/253 |
| 2008/0197982 A1* | 8/2008 | Sadr | H03M 13/2957 340/10.4 |
| 2012/0069893 A1* | 3/2012 | Shirakata | H04L 25/0262 375/239 |
| 2014/0126442 A1 | 5/2014 | Jafarian et al. | |
| 2015/0092649 A1 | 4/2015 | Wu et al. | |
| 2015/0334650 A1 | 11/2015 | Park | |

FOREIGN PATENT DOCUMENTS

| | | |
|---|---|---|
| WO | 2012067884 | 5/2012 |
| WO | 2015026803 | 2/2015 |

OTHER PUBLICATIONS

International Search Report and Written Opinion for PCT/US2016/025142, dated Aug. 30, 2016, 13 pages.
Office Action for U.S. Appl. No. 14/864,952, dated Feb. 24, 2016, 11 pages.
IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.
Notice of Allowance for U.S. Appl. No. 14/864,952, dated Jun. 23, 2016, 12 pages.
Office Action for U.S. Appl. No. 15/272,827, dated Mar. 20, 2017, 18 pages.
Notice of Allowance for U.S. Appl. No. 15/272,827, dated Aug. 16, 2017, 8 pages.

\* cited by examiner

APPARATUS, SYSTEM AND METHOD OF COMMUNICATING A WAKEUP PACKET

TECHNICAL FIELD

Embodiments described herein generally relate to communicating a wakeup packet.

BACKGROUND

Some computing devices, for example, small computing devices, such as, for example, wearable devices and/or sensors, are constrained by a small battery capacity.

However, such devices may be required to support wireless communication technologies such as, for example, Wi-Fi, and/or Bluetooth (BT), for example, to connect to other computing devices, e.g., a Smartphone, for example, to exchange data.

Exchanging data using the wireless communication technologies may consume power of the battery, and it may be beneficial, or even critical, to minimize energy consumption of one or more communication blocks in such computing devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
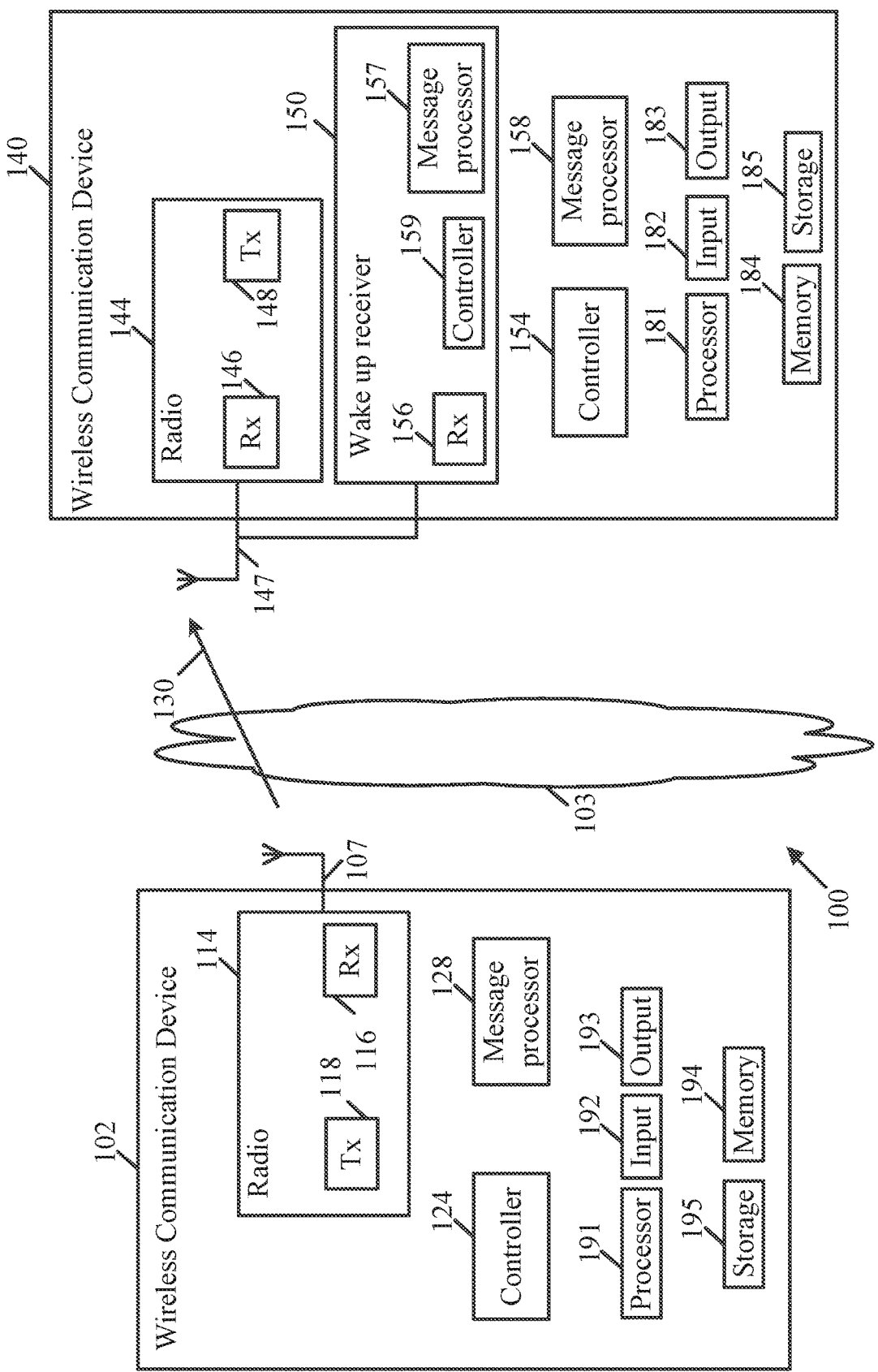
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012); IEEE802.11ac-2013 ("*IEEE P802.11ac-2013, IEEE Standard for Information Technology—Telecommunications and Information Exchange Between Systems—Local and Metropolitan Area Networks—Specific*

Requirements—Part 11: *Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 December, 2012); IEEE-802.11REVmc ("*IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*"); IEEE 802.11ax (*IEEE 802.11ax, High Efficiency WLAN (HEW)*); IEEE802.11-ay (*P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (including *WiFi P2P technical specification, version* 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, device 102 and/or device 140 may include a mobile device or a non-mobile, e.g., a static, device. For example, device 102 and/or device 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, sensor device, a wearable device, a BT device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In some demonstrative embodiments, device 102 and/or device 140 may include, operate as, and/or perform the functionality of one or more BT devices.

In some demonstrative embodiments, device 102 and/or device 140 may include, operate as, and/or perform the functionality of one or more Neighbor Awareness Networking (NAN) STAs.

In some demonstrative embodiments, device 102 and/or device 140 may include, operate as, and/or perform the functionality of one or more location measurement STAs.

In some demonstrative embodiments, device 102 and/or device 140 may include, operate as, and/or perform the functionality of any other devices and/or STAs.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable additional or alternative hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include a channel over a 2.4 Gigahertz (GHz) frequency band, a channel over a 5 GHz frequency band, a channel over a millimeterWave (mmWave) frequency band, e.g., a 60 GHz frequency band, a channel over a sub 1 Gigahertz (S1G) frequency band, and/or any other channel over any other band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, radio 144, transmitter 118, transmitter 148, receiver 116, and/or receiver 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative embodiments, radios 114 and/or 144 may be configured to communicate according to an OFDM scheme. For example, radios 114 and/or 144 may include an OFDM receiver and/or an OFDM transmitter. In other embodiments, radios 114 and/or 144 may be configured to communicate with any other additional or alternative modulation scheme.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include a wearable device, a sensor, small device, a mobile device, and/or any other device, which may be, for example, powered by a battery and/or any other power source having a limited capacity.

In some demonstrative embodiments, device 102 and/or device 140 may support wireless communication technologies such as, for example, Wi-Fi, Bluetooth (BT), and/or any other additional or alternative technology, for example, to connect between device 102, device 140, and/or other wireless devices.

In some demonstrative embodiments, device 140 may include a wearable device and/or a sensor device powered by a power source having a limited capacity, e.g., a small battery.

In some demonstrative embodiments, device 140 may be configured to communicate data with another device, e.g., device 102, which may be less power constrained than device 140, for example, a Smartphone.

In some demonstrative embodiments, communicating data between device 102 and device 140 may consume power of the power source of device 140.

In some demonstrative embodiments, minimizing energy consumption of one or more communication blocks, modules and/or elements of device 140 may be beneficial, and in some cases, even critical, for example, in order to reduce and/or minimize power consumption of the power source of device 140.

In some demonstrative embodiments, power consumption of device 140 may be reduced, e.g., minimized, for example, by powering off one or more communication blocks, modules and/or elements of device 140, e.g., as much as possible, for example, while maintaining data transmission and/or reception capabilities of device 140, e.g., without substantially increasing latency and/or degrading quality of data communication.

In one example, one or more communication blocks, modules and/or elements of device 140 may be powered on and/or may be woken up, for example, only when there is data to transmit, and/or only when there is data to receive. According to this example, the one or more communication blocks, modules and/or elements of device 140 may be powered off and/or switched to a sleep mode, for example, for the rest of the time.

For example, one or more elements of radio 144 may be powered on and/or may be woken up, for example, only when device 140 has data to transmit, and/or only when device 140 has data to receive. According to this example, one or more elements of radio 144 may be powered off and/or switched to the sleep mode, for example, for the rest of the time.

In some demonstrative embodiments, device 140 may include a wakeup receiver 150 configured to power on and/or to wakeup radio 144 of device 140.

In some demonstrative embodiments, wakeup receiver 150 may wake up radio 144, for example, based on a packet, e.g., a wakeup packet, received from another device, e.g., device 102, which is, for example, to transmit data to device 140.

In some demonstrative embodiments, wakeup receiver 150 may include a receiver 156 configured to receive the wakeup packet.

In some demonstrative embodiments, wakeup receiver 150 may include circuitry and/or logic configured to receive, decode, demodulate, and/or process the wakeup packet.

In some demonstrative embodiments, receiver 156 may include circuitry; logic; Radio Frequency (RF) elements, circuitry and/or logic; baseband elements, circuitry and/or logic; demodulation elements, circuitry and/or logic; amplifiers; analog to digital converters; filters; and/or the like.

In some demonstrative embodiments, wakeup receiver 150 may include a controller 159 configured to control one or more operations and/or functionalities of wakeup receiver 150, e.g., for processing the wakeup packet and/or waking up radio 144. For example, controller 159 may be configured to control a power supply of radio 144, and/or any other mechanism to wakeup radio 144, e.g., upon determining that a wakeup packet has been received by wakeup receiver 150.

In some demonstrative embodiments, controller 159 may be configured to perform one or more communications, to generate and/or communicate one or more messages and/or transmissions, and/or to perform one or more functionalities, operations and/or procedures, e.g., as described below.

In some demonstrative embodiments, controller 159 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 159. Additionally or alternatively, one or more functionalities of controller 159 may be implemented by logic, which may be executed by a machine and/or one or more processors, e.g., as described below.

In one example, controller 159 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, wakeup receiver 150 may include a message processor 157 configured to process and/or access one or messages communicated by wakeup receiver 150.

In some demonstrative embodiments, message processor 157 may be configured to process one or more wakeup packets received by wakeup receiver 150, and/or to indicate to controller 159 that a wakeup packet is received.

In one example, message processor 157 may be configured to access, process, demodulate and/or decode reception of the wakeup packets by a wireless station, e.g., a wireless STA implemented by device 140.

In some demonstrative embodiments, message processor 157 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 157. Additionally or alternatively, one or more functionalities of message processor 157 may be implemented by logic, which may be executed by a machine and/or one or more processors, e.g., as described below.

In some demonstrative embodiments, at least part of the functionality of message processor 157 may be implemented as part of message processor 158.

In some demonstrative embodiments, at least part of the functionality of message processor 157 may be implemented as part of any other element of wakeup receiver 150. For example, at least part of the functionality of message processor 157 may be implemented as part of receiver 156 and/or controller 159.

In some demonstrative embodiments, at least part of the functionality of receiver 156, controller 159 and/or message processor 157 may be implemented by an integrated circuit, for example, a chip, e.g., a System on Chip (SoC). In one example, the chip or SoC may be configured to perform one or more functionalities of radio 144, controller 154 and/or message processor 158. For example, the chip or SoC may include one or more elements of controller 159, one or more elements of message processor 157, and/or one or more elements of receiver 156, one or more elements of radio 144, one or more elements of message processor 158, and/or one or more elements of controller 154. In one example, wakeup receiver 150, message processor 158, controller 154, and/or radio 144 may be implemented as part of the chip or SoC.

In other embodiments, radio 144, wakeup receiver 150, controller 154 and/or message processor 158 may be implemented by one or more additional or alternative elements of device 140.

In some demonstrative embodiments, wakeup receiver 150 may be associated with one or more of antennas 147, e.g., which may be shared with radio 144.

In other embodiments, wakeup receiver 150 may include, or may be associated with, another, e.g., separate, antenna.

In some demonstrative embodiments, wakeup receiver 150 may be configured to wake up radio 144, for example, if device 140 has data to transmit, and/or if data is to be received by radio 144.

In one example, wakeup receiver 150 may be configured to implement a low-power wakeup receiver (LP-WUR) scheme, for example, to wakeup radio 144, e.g., only when device 140 is to receive data and/or to transmit data.

In some demonstrative embodiments, wakeup receiver 150 may have, for example, a relatively low power consumption, e.g., less than 100 microwatts. Accordingly, the power consumption of device 140 may be reduced for example, during times when there is no data to be received at device 140 and only wakeup receiver 150 is on.

In some demonstrative embodiments, wakeup receiver 150 may wake up radio 144, for example, based on a wakeup packet received from device 102.

In one example, receiver 156 may be configured to receive the wakeup packet from device 102, message processor 156 may be configured to process the wakeup packet, and/or controller 159 may be configured to wake up radio 144.

In some demonstrative embodiments, device 140 may be configured to transmit the wakeup packet to device 102, for example, to indicate to wakeup receiver 150 that the radio 144 is to be woken up, e.g., to receive data from device 102.

In some demonstrative embodiments, controller 159 may be configured to cause radio 144 to wake up, e.g., to switch to an active mode, for example, to receive data from device 102, e.g., subsequent to receiving the wakeup packet from device 102.

In some demonstrative embodiments, controller 159 may be configured to cause, control and/or trigger radio 144 to wake up, e.g., to switch to an active mode, for example, to transmit data to device 102 and/or to another device.

In some demonstrative embodiments, device 102 and/or device 140 may be configured to communicate the wakeup packet, for example, in compliance with one or more wireless communication standards and/or protocols.

In some demonstrative embodiments, device 102 and/or device 140 may be configured to communicate the wakeup packet, for example, in compliance with one or more existing wireless communication standards and/or protocols ("legacy standards"), for example, in compliance with one or more IEEE 802.11 standards.

In some demonstrative embodiments, the wakeup packet may include a preamble ("legacy preamble") in compliance with one or more legacy standards.

In some demonstrative embodiments, the wakeup packet may include a preamble in compliance with one or more legacy standards, for example, to enable one or more legacy devices to decode and/or process the preamble.

In some demonstrative embodiments, the wakeup packet may include a payload, e.g., following the legacy preamble.

In some demonstrative embodiments, the payload may be modulated by a simple modulation scheme, for example, an On-Off Keying (OOK) modulation scheme.

Some demonstrative embodiments are described herein with respect to an OOK modulation scheme. However, in other embodiments the wakeup packet may include a payload modulated according to any other Amplitude-Shift Keying (ASK) modulation scheme, a Frequency Shift Keying (FSK) modulation scheme, and/or any other modulation scheme.

In some demonstrative embodiments, using a dedicated OOK transmitter to modulate the payload of the wakeup packet may not be efficient.

In one example, it may not be efficient and/or advantageous to generate the wakeup packet using a separate wakeup packet transmitter with an OOK modulator. For example, in such implementation a device ("transmitter device"), transmitting the wakeup packet, e.g., device 102, may be required to have two separate transmit modules, for example, a first transmit module, for example, an OFDM transmitter, e.g., radio 114, in compliance with the IEEE 802.11 standards, and a second transmitter, e.g., an OOK transmitter, to transmit the payload of the wakeup packet.

In some demonstrative embodiments, the transmitter device, e.g., device 102, may be configured to generate a wakeup packet, for example, by reusing an OFDM transmitter, e.g., a transmitter in compliance with the IEEE 802.11 standards.

In some demonstrative embodiments, the transmitter device, e.g., device 102, may be configured to use the same transmitter, for example, an OFDM transmitter, e.g., radio 114, for example, to generate the wakeup packet including both the legacy preamble, which may be modulated using the OFDM modulation scheme, and the payload, e.g., which may be modulated using the OOK modulation scheme.

In some demonstrative embodiments, the transmitter device, e.g., device 102, may be configured to generate a wakeup packet, for example, without needing to use a dedicated transmit module, e.g., a dedicated OOK transmit module.

In some demonstrative embodiments, device 102, may be configured to use transmitter 118 of radio 114, for example, to generate the wakeup packet including both the legacy preamble and the wakeup payload, for example, without needing to use two separate transmit modules, e.g., as described below.

In some demonstrative embodiments, device 102 and/or device 140 may be configured to communicate a wakeup packet using a wakeup radio pulse design, which may be, for example, uniquely enabled by the re-use of the OFDM transmitter, e.g., as described below.

In some demonstrative embodiments, device 102 may generate a wakeup packet including a preamble and a payload.

In one example, controller 124 may cause, trigger and/or control message generator 128 to generate the wakeup packet.

In some demonstrative embodiments, controller 124 may be configured to cause, control, and/or trigger radio 114 to modulate the preamble of the wakeup packet according to an Orthogonal Frequency Division Multiplexing (OFDM) scheme, e.g., as described below.

In some demonstrative embodiments, controller 124 may be configured to cause, control, and/or trigger radio 114 to modulate the payload of the wakeup packet according to the OOK modulation scheme over a plurality of OFDM tones of the OFDM scheme, e.g., as described below.

In some demonstrative embodiments, radio 114 may transmit the wakeup packet to device 140.

In some demonstrative embodiments, wakeup receiver 150 may receive the wakeup packet.

In some demonstrative embodiments, wakeup receiver 150 may be configured to demodulate the preamble of the wakeup packet from device 102 according to the OFDM scheme.

In some demonstrative embodiments, wakeup receiver 150 may be configured to demodulate the payload of the wakeup packet according to the OOK modulation scheme over the plurality of the OFDM tones of the OFDM scheme.

In some demonstrative embodiments, wakeup receiver 150 may be configured activate radio 154 of device 140, for example, based on the payload of the wakeup packet, e.g., as described below.

In some demonstrative embodiments, the payload of the wakeup packet may include a plurality of payload values, for example, a predefined sequence of values, which may be configured to indicate that the packet is a wakeup packet, e.g., as described below with reference to FIG. 2. For example, wakeup receiver 150 may be configured to decode the payload of a received packet, and to determine that the received packet is a wakeup packet, for example, if the payload include the predefined sequence of values.

In some demonstrative embodiments, controller 124 and/or message processor 128 may be configured to set a signal field in the preamble to indicate at least a duration of the payload.

In some demonstrative embodiments, controller 124 and/or message processor 128 may be configured to set a rate field and a length field in the signal field, for example, based on a number of the plurality of OFDM tones, and a number of OOK bits in the payload, e.g., as described below with reference to FIG. 2.

Figure 2:
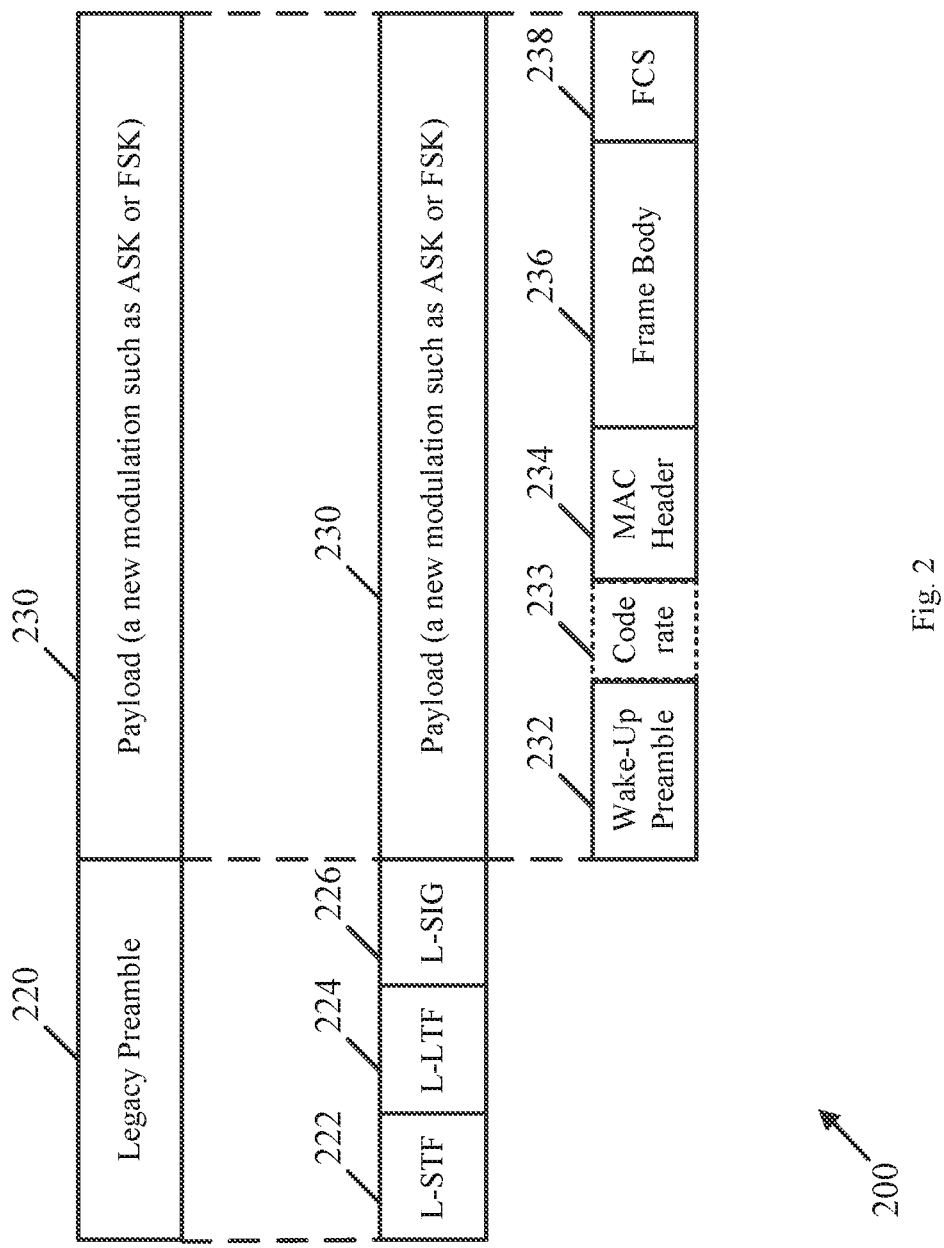
FIG. 2 is a schematic illustration of a wakeup packet, in accordance with some demonstrative embodiments.

Reference is made to FIG. 2, which schematically illustrates a wakeup packet 200, in accordance with some demonstrative embodiments.

In one example, device 102 (FIG. 1) may transmit wakeup packet 200 to device 140 (FIG. 1), for example, to indicate to wakeup receiver 150 (FIG. 1) that radio 144 (FIG. 1) is to be woken up.

In some demonstrative embodiments, message processor 128 (FIG. 1), may be configured to construct and/or generate wakeup packet 200.

As shown in FIG. 2, wakeup packet 200 may include a preamble 220 ("Legacy Preamble") and a payload 230.

In some demonstrative embodiments, preamble 220 may include, for example, a preamble construction in compliance with an IEEE 802.11 standard ("Legacy 802.11 preamble construction").

As shown in FIG. 2, preamble 220 may include a legacy short training field (L-STF) 222, for example, based on the IEEE 802.11-2012 standard, e.g., according to section 18.3.3 (PLCP preamble), and/or in accordance with any other section and/or of any other Standard.

As shown in FIG. 2, preamble 220 may include a legacy long training field (L-LTF) 224, for example, based on the IEEE 802.11-2012 standard, e.g., according to section 18.3.3 (PLCP preamble), and/or in accordance with any other section and/or of any other Standard.

As shown in FIG. 2, preamble 220 may include a signal field (L-SIG) 226, for example, based on the IEEE 802.11-2012 standard, e.g., according to section 18.3.4 (SIGNAL field), and/or in accordance with any other section and/or of any other Standard.

In some demonstrative embodiments, signal field 226 may include, for example, a rate field and/or a length field, for example, to indicate at least a duration of payload 230.

In some demonstrative embodiments, message processor 128 (FIG. 1) may be configured to set the rate field and the length field in signal field 226, for example, based on a number of the plurality of OFDM tones, and a number of OOK bits in payload 230.

In some demonstrative embodiments, the rate field and/or the length field may be set to values that indicate a longer time than an actual length of payload 230, for example, to protect a response packet, which may follow wakeup packet 200.

As shown in FIG. 2, payload 230 may include a wakeup preamble field 232, a Media Access Control (MAC) header field 234, a Frame body 236, and/or a Frame Check Sequence (FCS) field 238. In other embodiments, payload 230 may include any other additional or alternative fields.

Referring back to FIG. 1, in some demonstrative embodiments device 102 may be configured to generate a payload of a wakeup packet, e.g., payload 230 (FIG. 2), for example, according to a transmit pulse design, e.g., as described below.

In some demonstrative embodiments, controller 124 may cause, trigger and/or control radio 114 to generate a transmit pulse over the plurality of OFDM tones.

In some demonstrative embodiments, the plurality of OFDM tones may include 12 OFDM tones.

In other embodiments, the plurality of OFDM tones may include any other number of OFDM tones, e.g., greater than or less than 12 OFDM tones.

In some demonstrative embodiments, message processor 128 may construct the transmit pulse, for example, to provide improved performance of a wakeup radio link.

In some demonstrative embodiments, message processor 128 may construct the transmit pulse using the plurality of OFDM tones, e.g., as described below.

In some demonstrative embodiments, a plurality of OFDM tones, including a number, denoted n, of a total number, denoted m, of OFDM tones, wherein n<=m, may be used, for example, to construct the transmit pulse, e.g., as described below with reference to FIGS. 3 and/or 4.

Figure 3:
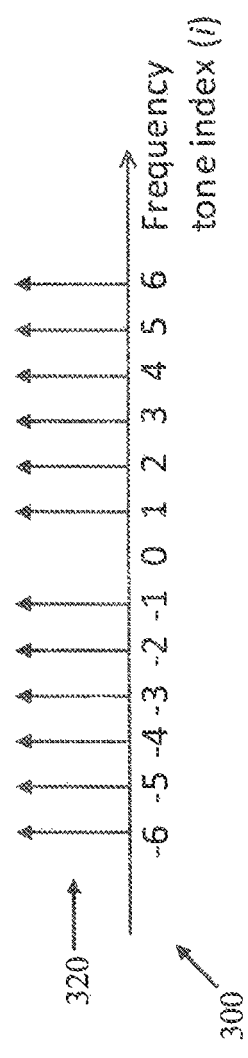
FIG. 3 is a schematic illustration of a plurality of frequency tones of a transmit pulse, in accordance with some demonstrative embodiments.

Reference is made to FIG. 3, which schematically illustrates a plurality of OFDM tones 320 of a transmit pulse 300, in accordance with some demonstrative embodiments.

In one example, controller 124 (FIG. 1) may cause radio 114 (FIG. 1) to generate the transmit pulse 300 over the plurality of OFDM tones 320.

As shown in FIG. 3, the plurality of OFDM tones 320 may include n tones, e.g., n=12, of a total number of m OFDM tones, e.g., m=64, for example, for a 20 Megahertz (MHz) channel. According to this example, a wakeup signal bandwidth may be, for example, 4.06 MHz.

For example, as shown in FIG. 3, the plurality of OFDM tones 320 may include 12 tones centered on a central tone, e.g., a Direct Current (DC) tone, denoted "0". For example, the plurality of OFDM tones 320 may include six tones, denoted "−6", "−5", "−4", "−3", "−2", and "−1", on one side of the DC tone; and six tones, denoted "1", "2", "3", "4", "5", and "6", on another side of the DC tone.

In other embodiments, any other number of tones, and/or any other arrangement of tones may be used.

In some demonstrative embodiments, the transmit pulse 300 may include, for example, the number n, e.g., n=12, of subcarriers, which may be modulated, for example, by elements of a predefined sequence, denoted S.

In some demonstrative embodiments, the sequence S may include, for example, the following sequence:

$S_{-26,26}$=sqrt(13/6)*{0,0,0,0, 0,0,0,0, 0,0,0,0, 0,0,0,0, 0,0,
0,0, 1+j, −1−j, 1+j, −1−j, −1−j, 1+j, 0, −1−j, −1−j, 1+j,
1+j, 1+j, 1+j,
0,0,0,0, 0,0,0,0, 0,0,0,0, 0,0,0,0, 0,0,0,0}

In other embodiments, any other sequence may be used.

In some demonstrative embodiments, controller 124 (FIG. 1) may be configured to cause, control, and/or trigger radio 114 (FIG. 1) to generate the transmit pulse 300, for example, using a transmit signal generation scheme of OFDM signals.

In one example, the transmit pulse may be generated, for example, in compliance with the *IEEE 802.11-2012 standard*, e.g., followed by a 0.8 microsecond (usec) cyclic prefix extension.

Figure 4:
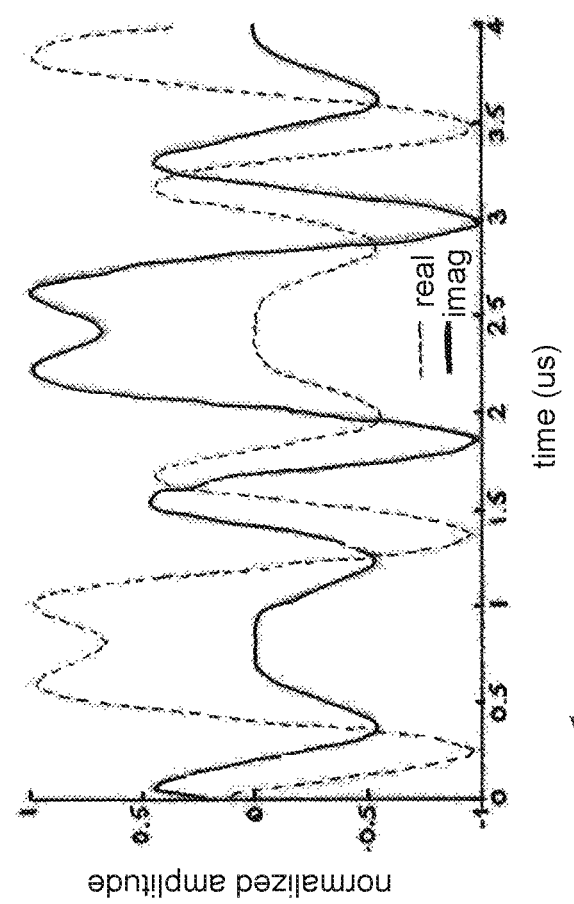
FIG. 4 is a schematic illustration of a transmit pulse, in accordance with some demonstrative embodiments.

Reference is made to FIG. 4, which schematically illustrates a transmit pulse 400, in accordance with some demonstrative embodiments.

In one example, controller 124 (FIG. 1) may be configured to cause, control, and/or trigger radio 114 (FIG. 1) to generate transmit pulse 400, for example, over the plurality of frequency tones 320 (FIG. 3), e.g., as described above.

Referring back to FIG. 1, in some demonstrative embodiments, controller 124 may be configured to cause, control, and/or trigger radio 114 to modulate a plurality of payload bits of the wakeup payload, e.g., payload 230 (FIG. 2), by selectively transmitting a transmit pulse, e.g., transmit pulse 400 (FIG. 4), during one or more OFDM symbol periods of a plurality of OFDM symbol periods, e.g., as described below.

In some demonstrative embodiments, controller 124 may be configured to cause and/or trigger radio 114 to select whether or not to transmit the transmit pulse over at least one OFDM symbol period, for example, based on a bit value of a payload bit.

In some demonstrative embodiments, controller 124 may be configured to cause and/or trigger radio 114 to select to transmit the transmit pulse, e.g., transmit pulse 400 (FIG. 4), over the OFDM symbol period to indicate a bit value of "1" of a payload bit.

In one example, controller 124 may be configured to cause, control, and/or trigger radio 114 to transmit a bit value of '1' of a payload bit, for example, by transmitting the transmit pulse, e.g., transmit pulse 400 (FIG. 4), for example, during one OFDM symbol period.

In some demonstrative embodiments, controller 124 may be configured to cause, control, and/or trigger radio 114 to select not to transmit the transmit pulse over the OFDM symbol period to indicate a bit value of "0" of a payload bit.

In one example, controller 124 may be configured to cause, control and/or trigger radio 114 to transmit a bit value of '0' of a payload bit, for example, by selecting not to transmit the transmit pulse, e.g., during one OFDM symbol period.

In some demonstrative embodiments, wakeup receiver 150 may receive the wakeup packet including the payload modulated according to the OOK scheme.

In some demonstrative embodiments, wakeup receiver 150 may be configured to demodulate the plurality of payload values of the payload of the wakeup packet received from device 102, for example, by detecting which OFDM symbol periods of the plurality of OFDM symbol periods include a transmit pulse over the plurality of OFDM tones.

In some demonstrative embodiments, wakeup receiver 150 may be configured to determine a bit value of "1" of a payload bit corresponding to at least one OFDM symbol period, for example, when the transmit pulse is received during the OFDM symbol period.

In some demonstrative embodiments, wakeup receiver 150 may be configured to determine a bit value of "0" corresponding to at least one OFDM symbol period, for example, when the transmit pulse is not received during the OFDM symbol period.

In one example, wakeup receiver 150 may be configured to process the payload of the wakeup packet from device 102, for example, by determining a bit value of '1', e.g., with respect to a received OFDM symbol including the transmit pulse; and/or determining a bit value of '0', e.g., with respect to a received OFDM symbol not including the transmit pulse.

In some demonstrative embodiments, using a simple r repetition coding, for example, to encode the plurality of payload bits, may not be effective. For example, using a simple r repetition coding, e.g., an 1/r code rate, for example, by transmitting the transmit pulses during r OFDM symbol periods, e.g., to transmit a value of '1'; and/or by not transmitting the transmit pulse during r OFDM symbol periods, e.g., to transmit the value of '0', may not be advantageous, e.g., as descried below.

In some demonstrative embodiments, applying repetition coding to the wakeup packet may result in a relatively long silent period in the wakeup packet, e.g., a silent period which may be longer than a Short Inter-frame Space (SIFS), e.g., 16 usec.

Figure 5:
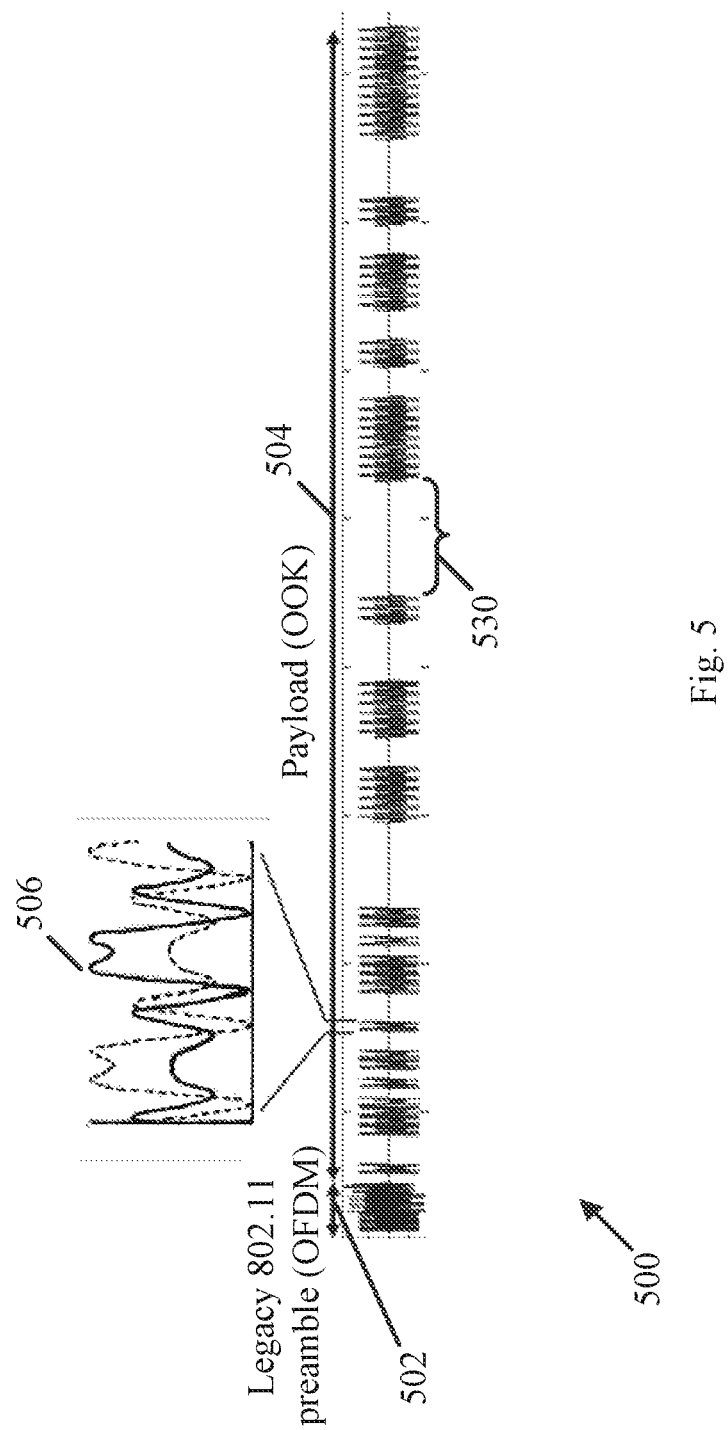
FIG. 5 is a schematic illustration of a transmission of a wakeup packet including a silent period, in accordance with some demonstrative embodiments.

Reference is made to FIG. 5, which schematically illustrates a transmission of a wakeup packet 500 including a silent period 530, in accordance with some demonstrative embodiments.

As shown in FIG. 5, wakeup packet 500 may include a legacy preamble 502 followed by a payload 504.

In some demonstrative embodiments, legacy preamble 502 may be modulated according to an OFDM modulation, e.g., as described above.

In some demonstrative embodiments, payload 504 may be modulated according to the OOK modulation scheme over a plurality of OFDM tones, e.g., as described above.

As shown in FIG. 5, payload 504 may include a transmit pulse 506, e.g., transmit pulse 400 (FIG. 4).

In one example, as shown in FIG. 5, wakeup packet 500 may be encoded using a 3× repetition coding. According to this example, one OOK pulse may have a duration of 4 usec, for example, using one OFDM symbol period.

As shown in FIG. 5, when 3× repetition coding is used, a bit value "0" of a payload bit of payload 504 may be represented by a 12 usec silent period.

In some demonstrative embodiments, as shown in FIG. 5, even a relatively small number of consecutive payload bits including a bit value of zero, e.g., even 2-3 consecutive zero bits, in payload 504, may result in a silent period 530, which may have a duration of 24-36 usec, e.g., a duration longer than a SIFS.

In some demonstrative embodiments, as shown in FIG. 5, if a silent period, e.g., silent period 530, becomes too long, e.g., longer than one SIFS, a third party station may be able to access the medium, e.g., even at the middle of a transmission of wakeup packet 500, for example, if the third party station does not receive an indication of a duration of the wakeup packet, e.g., in legacy preamble 502.

Referring back to FIG. 1, some demonstrative embodiments may enable to transmit a wakeup packet, for example, without any long silent periods, e.g., silent period 530 (FIG. 5), which may enable a third party station to interfere with a transmission of the wakeup packet, e.g., as described below.

Some demonstrative embodiments may enable to design a wakeup packet without any long silent periods, e.g., silent period 530 (FIG. 5), within a payload of the wakeup packet, e.g., payload 504 (FIG. 5). The wakeup packet without any long silent periods may prevent the third party station from accessing the wireless medium, for example, during the transmission of the wakeup packet.

In some demonstrative embodiments, devices 102 and/or 140 may be configured to encode and/or decode the wakeup packet according to a coding scheme, which may be configured, for example, to prevent, avoid, and/or reduce the probability of, a long silent period in the wakeup packet.

In some demonstrative embodiments, avoiding the long silent period in the wakeup packet may enable to prevent, avoid, and/or reduce the probability of, a third party station to access the medium in the middle of the wakeup packet.

In some demonstrative embodiments, devices 102 and/or 140 may be configured encode and/or decode the wakeup packet according to a coding scheme, which may use an orthogonal coding that does not have consecutive zeros, for example, to represent the bit values "0" and "1" of the payload bits, e.g., instead of an r repetition coding.

In some demonstrative embodiments, devices 102 and/or 140 may be configured encode and/or decode the wakeup packet according to a coding scheme, which assigns a first code to the bit value "0", and a second code to the bit value "1", for example, such that the first and/or second codes do not include a sequence of zeros, which is longer than a predefined number of zeros, e.g., as descried below.

In some demonstrative embodiments, device 102 may be configured to generate a wakeup packet, which may be encoded using an orthogonal coding, which does not use consecutive zeros, e.g., as described below.

In some demonstrative embodiments, controller 124 may be configured to control, cause and/or trigger device 102 to generate a wakeup packet 130 including a payload field modulated according to an OOK modulation.

In one example, controller 124 may be configured to control, cause and/or trigger message processor 128 to generate wakeup packet 130. For example, wakeup packet 130 may include wakeup packet 200 (FIG. 2).

In some demonstrative embodiments, the payload field may include a sequence of a plurality of codes to encode binary bit values of the payload field, for example, according to an encoding scheme having a code rate less than one, e.g., as described below.

In some demonstrative embodiments, the coding scheme may include first and second codes, e.g., as described below.

In some demonstrative embodiments, the first code may represent a binary bit value of "0", and the second code may represent a binary bit value of "1".

In some demonstrative embodiments, the first code may include a first sequence of two or more bits including at least one bit having a value of "1", e.g., as described below.

In some demonstrative embodiments, the second code may include a second sequence of two or more bits including at least one bit having a value of "1", e.g., as described below.

In some demonstrative embodiments, the first code may be orthogonal to the second code.

In some demonstrative embodiments, each of the first and second codes may include no more than two consecutive zero bits.

In some demonstrative embodiments, each of the first and second codes may include no consecutive zero bits.

In some demonstrative embodiments, the encoding scheme may use at least a first code rate and/or a second code rate, which is less than one, e.g., as described below.

In some demonstrative embodiments, a device transmitting a wakeup packet, e.g., device 102, may be configured to select between two or more predefined code rates for the encoding scheme. In one example, the device transmitting a wakeup packet, e.g., device 102, may negotiate the code rate of the encoding scheme with a device, e.g., device 140, to receive the wakeup packet. In another example, the code rate of the encoding scheme may be selected according to any other mechanism, or may be preconfigured.

In some demonstrative embodiments, the code rate may include a code rate of 1/2 or a code rate of 1/4. In other embodiments, the coding scheme may include any other number of code rates and/or any other code rates, which are less than one.

In some demonstrative embodiments, one code of the first and second codes may include a code "01", and another code of the first and second codes may include a code "10", for example, according to the code rate of 1/2.

In one example, a code "01" may represent a bit value of "0", and a code "10" may represent a bit value of "1".

In another example, a code "10" may represent a bit value of "0", and a code "01" may represent a bit value of "1".

In some demonstrative embodiments, one code of the first and second codes may include a code "0101", and another code of the first and second codes may include a code "1010", for example, according to the code rate of 1/4.

In one example, a code "0101" may represent a bit value of "0", and a code "1010" may represent a bit value of "1".

According to this example, two consecutive payload bits having the sequence "00", may be encodes as "01010101", which may have a longest silent period of 4 usec, e.g., assuming one OFDM period is being used to represent one bit.

According to this example, two consecutive payload bits having the sequence "10" may be encoded as "10100101", which may have a longest silent period of 8 usec.

According to these examples, in a worst case, the silent period may be 8 usec, which is still less than a duration of one slot time, e.g., 9 usec.

In another example, a code "1010" may represent a bit value of "0", and a code "0101" may represent a bit value of "1".

In some demonstrative embodiments, any other additional or alternative codes may be used for the first and second codes. For example, a code "1001" may represent a bit value of "0", and a code "0110" may represent a bit value of "1".

In some demonstrative embodiments, the code rate according to the encoding scheme, e.g., 1/2 or 1/4, may be indicated in the payload of wakeup packet 130, e.g., as described below.

In some demonstrative embodiments, the payload of the wakeup packet may include a code rate field configured to indicate the code rate to encode at least one field of the payload field of the wakeup packet.

In some demonstrative embodiments, the code rate field may be prior to the at least one payload field of the wakeup packet, e.g., as described below.

In some demonstrative embodiments, the code-rate field may be encoded with a code rate, which is a lowest of a code rate supported by devices 102 and 140.

In some demonstrative embodiments, the code-rate field may be encoded with a code rate, which may be lower than the code rate indicated by the code-rate field.

In some demonstrative embodiments, a format of a wakeup packet, e.g., wakeup packet 200 (FIG. 2), may be configured, for example, to indicate the code rate.

In some demonstrative embodiments, a format of a wakeup packet, e.g., wakeup packet 200 (FIG. 2), may be configured, for example, to include the code-rate field, e.g., as described below.

Referring back to FIG. 2, in some demonstrative embodiments, wakeup packet 200 may be configured, for example, to indicate the code rate.

In some demonstrative embodiments, as shown in FIG. 2, payload 230 may include a code rate field 233, for example, to indicate the code rate to be used for encoding bits of payload 230.

In some demonstrative embodiments, the code-rate field 233 may have a length of n bits, for example, to support up to $2^n$ code rates.

In some demonstrative embodiments, as shown in FIG. 2, the code-rate field 233 may follow wakeup preamble 232 of wakeup packet 200.

In some demonstrative embodiments, the code rate field 233 may be followed by a parity bit, e.g., to enable checking any error in the code-rate field 233.

In some demonstrative embodiments, the code-rate field 233 may be encoded at a low rate, for example, the lowest code rate supported by devices 102 and 140 (FIG. 1).

In some demonstrative embodiments, the code-rate field 233 may include a value selected from first and second values, for example, if two code rates are supported, e.g., as follows:

a. Code-rate field=0, e.g., indicates 1/2 code rate, may be encoded, for example, as 0101.

b. Code-rate field=1, e.g., indicates 1/4 code rate, may be encoded, for example, as 1010.

In one example, a code rate, which may be used by a first station, for a wakeup packet transmission between the first station and a second station, may be pre-negotiated between the first and second stations. According to this example, the code rate field 233 may not need to be present in the wakeup packet 200.

Referring back to FIG. 1, in some demonstrative embodiments, controller 124 may be configured to control, cause and/or trigger device 102 to generate wakeup packet 130 including a payload field, for example, one or more fields of payload 230 (FIG. 2).

In some demonstrative embodiments, the payload field may include a sequence of a plurality of codes to encode binary bit values of the payload field, for example, according to an encoding scheme, e.g., as described above.

In some demonstrative embodiments, controller 124 may be configured to control, cause and/or trigger device 102 to generate wakeup packet 130 including a code rate field in the payload, for example, code rate field 233 (FIG. 2), e.g., to indicate a code rate used to encode the payload fields.

In some demonstrative embodiments, controller 124 may be configured to control, cause and/or trigger device 102 to modulate a preamble of the wakeup packet 130, e.g., preamble 220 (FIG. 2), according to an OFDM scheme, and to modulate bits of the sequence of codes over a plurality of OFDM tones of the OFDM scheme.

In some demonstrative embodiments, controller 124 may be configured to control, cause and/or trigger device 102 to generate a transmit pulse, e.g., transmit pulse 400 (FIG. 4), over the OFDM tones, and to modulate the bits of the sequence of codes by selectively transmitting the transmit pulse during one or more OFDM symbol periods.

In some demonstrative embodiments, controller 124 may be configured to control, cause and/or trigger device 102 to select whether or not to transmit the transmit pulse, e.g., transmit pulse 400 (FIG. 4), over an OFDM symbol period, for example, based on a bit value of a bit of the bits of the sequence of codes.

In some demonstrative embodiments, controller 124 may be configured to control, cause and/or trigger device 102 to select not to transmit the transmit pulse over the OFDM symbol period to indicate a bit value of "0" of bits of the sequence of codes, and/or to transmit the transmit pulse over the OFDM symbol period to indicate a bit value of "1" of bits of the sequence of codes.

In some demonstrative embodiments, controller 124 may be configured to control, cause and/or trigger device 102 transmit wakeup packet 130. For example, controller 124 may be configured to control, cause and/or trigger radio 114 to transmit wakeup packet 130 to device 140.

In some demonstrative embodiments, device 140 may receive, e.g., from device 102, the wakeup packet 130 including the sequence of codes, e.g., in the payload of wakeup packet 130.

In some demonstrative embodiments, controller 154 and/or controller 159 may be configured to control, cause and/or trigger wakeup receiver 150 to process wakeup packet 130, e.g., as described below.

In some demonstrative embodiments, controller 154 and/or controller 159 may be configured to control, cause and/or trigger wakeup receiver 150 to demodulate a plurality of encoded bit sequences of at least one payload filed of wakeup packet 130.

In some demonstrative embodiments, controller 154 and/or controller 159 may be configured to control, cause and/or trigger wakeup receiver 150 to demodulate the plurality of encoded bit sequences, for example, by detecting which OFDM periods of a sequence of OFDM periods include a transmit pulse, e.g., transmit pulse 400 (FIG. 4), over a plurality of OFDM tones.

In some demonstrative embodiments, controller 154 and/or controller 159 may be configured to control, cause and/or trigger wakeup receiver 150 to determine a bit value of "1" corresponding to an OFDM symbol period, for example, when the transmit pulse, e.g., transmit pulse 400 (FIG. 4), is received during the OFDM symbol period; and to determine a bit value of "0" corresponding to the OFDM symbol period, for example, when the transmit pulse is not received during the OFDM symbol period.

In some demonstrative embodiments, controller 154 and/or controller 159 may be configured to control, cause and/or trigger wakeup receiver 150 to decode the plurality of encoded bit sequences, for example, to determine a plurality of OOK binary bit values of the payload field of wakeup packet 130.

In some demonstrative embodiments, controller 154 and/or controller 159 may be configured to control, cause and/or trigger wakeup receiver 150 to decode an encoded bit sequence of the plurality of encoded bit sequences, for example, by correlating the encoded bit sequence with a decoding code, e.g., as described below.

In some demonstrative embodiments, controller 154 and/or controller 159 may be configured to control, cause and/or trigger wakeup receiver 150 to determine a plurality of OOK binary bit values of the payload field, for example, by correlating the encoded bit sequence with the decoding code, e.g., as described below.

In some demonstrative embodiments, a bit-length of the decoding code may be equal to a bit-length of the encoded bit sequence.

In some demonstrative embodiments, the decoding code may be based, for example, on a code rate of the encoded bit sequence.

In some demonstrative embodiments, controller 154 and/or controller 159 may be configured to control, cause and/or trigger wakeup receiver 150 to determine the decoding code, for example, based on the code rate field of the wakeup packet 130, e.g., code rate field 233 (FIG. 2).

In some demonstrative embodiments, controller 154 and/or controller 159 may be configured to control, cause and/or trigger wakeup receiver 150 to decode the code rate field, e.g., code rate field 233 (FIG. 2), for example, according to a predefined code.

In some demonstrative embodiments, wakeup receiver 150 may decode the code rate field, for example, by correlating received bits of the code-rate field with the predefined code, e.g., using a correlator module, function, algorithm and/or the like, e.g., as described below.

In some demonstrative embodiments, the predefined code may include an orthogonal code of "1 −1 1 −1", e.g., assuming that the code rate 1/4 is the lowest code rate, and replacing 0 with −1 in "1010".

In some demonstrative embodiments, a code rate field in the wakeup packet, e.g., code rate field 233 (FIG. 2), may be transmitted with an indication of the encoded value of "0101" for "0", for example, to indicate the code rate of 1/2; or with an indication of the encoded value of "1010" for "1", for example, to indicate the code rate of 1/4, e.g., as described above.

In some demonstrative embodiments, wakeup receiver 150 may determine the code rate is 1/4, for example, if a correlation between the predefined code and the received bits of the code rate field is greater than a predefined value, e.g., 0.

In some demonstrative embodiments, wakeup receiver 150 may determine the code rate is 1/4, for example, if a correlation between the predefined code and the received bits of the code rate field is greater than 0. Otherwise, wakeup receiver 150 may determine the code rate is 1/2.

In one example, a correlation of vector multiplication, e.g., [1 −1 1 −1]×[1 0 1 0], for example, may result in a value of 2, e.g., if the received bits indicate the code rate of 1/4 and there are no errors in the received bits.

In another example, a correlation of vector multiplication, e.g., [1 −1 1 −1]×[0 1 0 1], for example, may result in a value of −2, e.g., if the received bits indicate the code rate of 1/2 and there are no errors in the received bits.

According to these examples, the predefined code may enable to determine the code rate, for example, even if there are some errors, e.g., one or more errors, in the received bits in the code rate field.

In some demonstrative embodiments, wakeup receiver 150 may determine the code rate by decoding the code rate field of wakeup packet 130, for example, using the correlation with the predefined code, and may use the determined code rate to determine the decoding code to be used to decode the payload field of wakeup packet 130.

In some demonstrative embodiments, the decoding code may include only the values "1" and "−1".

In some demonstrative embodiments, the decoding code may include the code "1 −1", for example, if the code rate is 1/2.

In some demonstrative embodiments, the decoding code may include the code "1 −1 1 −1", for example, if the code rate is 1/4.

In some demonstrative embodiments, wakeup receiver 150 may use the determined decoding code, for example, to decode the encoded bit sequence into binary bit values, for example, OOK binary bit values, e.g. as described below.

In some demonstrative embodiments, wakeup receiver 150 may decode the encoded bit sequence, for example, by correlating the encoded bit sequence of the payload with the decoding code determined according to the determined code rate, for example, using a correlator module, function, algorithm and/or the like, e.g., as described below.

In some demonstrative embodiments, controller 154 and/or controller 159 may be configured to control, cause and/or trigger wakeup receiver 150 to decode the encoded bit sequence into an OOK binary bit value of "1" when a correlation between the encoded bit sequence and the decoding code is greater than a threshold.

In some demonstrative embodiments, controller 154 and/or controller 159 may be configured to control, cause and/or trigger wakeup receiver 150 to decode the encoded bit sequence into an OOK binary bit value of "0" when a correlation between the encoded bit sequence and the decoding code is not greater than the threshold.

In one example, the threshold may be 0, and a received bit sequence may be "0100". According to this example, a correlation between the received bit sequence and the decoding code may result in a correlation value of −1, for example, [0 1 0 0]×[1 −1 1 −1]=−1, e.g., if the code rate is 1/4. Accordingly, wakeup receiver 150 may decode the received bit sequence "0100" into an OOK binary bit value of "0", e.g., since the correlation value is not greater than 0.

In another example, the threshold may be 0, and a received bit sequence may be "1000". According to this example, a correlation between the received bit sequence and the decoding code may result in a correlation value of 1, for example, [1 0 0 0]×[1 −1 1 −1]=−1, e.g., if the code rate is 1/4. Accordingly, wakeup receiver 150 may decode the received bit sequence "1000" into an OOK binary bit value of "1", e.g., since the correlation value is greater than 0.

In some demonstrative embodiments, controller 154 and/or controller 159 may be configured to control, cause and/or trigger wakeup receiver 150 to active radio 144, for example, based on the at least one payload field of wakeup packet 130.

In some demonstrative embodiments, wakeup receiver 150 may active radio 144, for example, if the OOK binary bit values, e.g., in payload field 230 (FIG. 2), of wakeup packet 130, which was encoded based on the received bit sequence, indicate a request to activate radio 144.

Figure 6A:
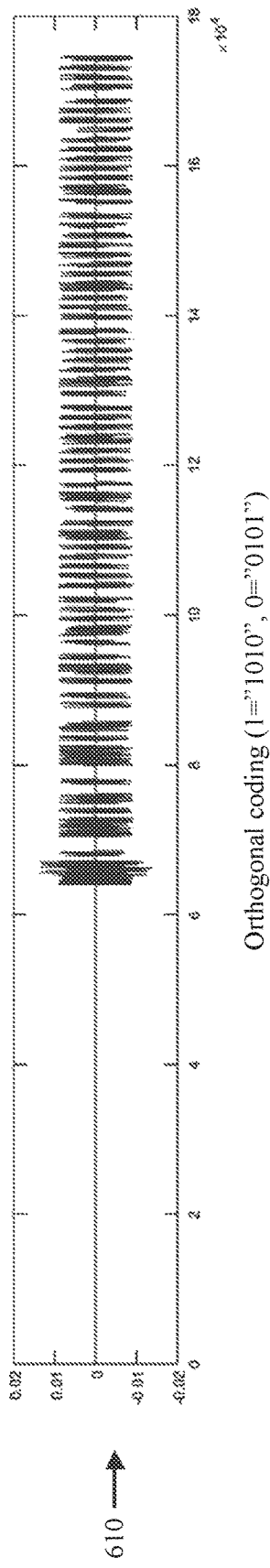
FIG. 6A is a schematic illustration of a transmission of a packet encoded with an orthogonal coding, in accordance with some demonstrative embodiments.
Figure 6B:
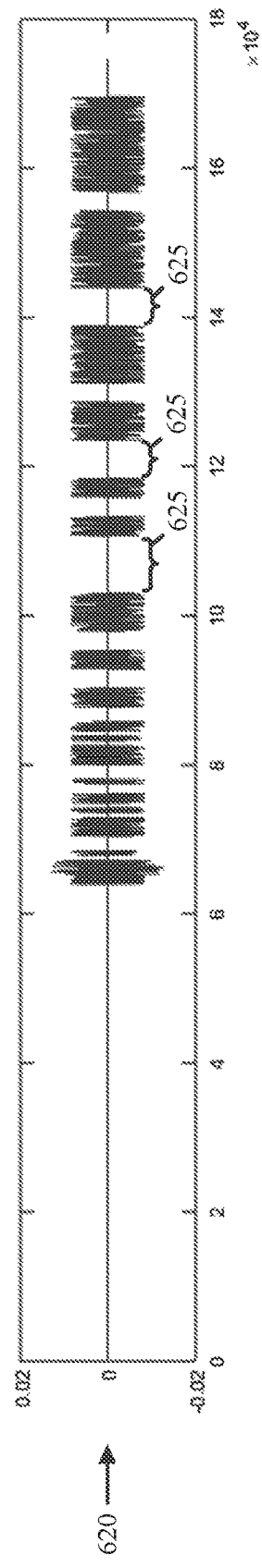
FIG. 6B is a schematic illustration of transmission of the packet of FIG. 6B encoded with a repetition coding, in accordance with some demonstrative embodiments.

Reference is made to FIG. 6A, which schematically illustrates a transmission 610 of a wakeup packet encoded with an orthogonal coding, and to FIG. 6B, which schematically illustrates a transmission 620 of the wakeup packet encoded with a repetition coding, in accordance with some demonstrative embodiments.

As shown in FIG. 6A, encoding the wakeup packet using the code scheme described herein, e.g., the code "1010" to encode the bit value "1" and the code "0101" to encode the bit value "0", may result in packet transmission 610, which may only have any silent periods, which may not be longer than one SIFS, during transmission 610 of the wakeup packet.

In contrast, as shown in FIG. 6B, the transmission of the wakeup packet encoded with a 4× repetition coding, e.g., using a code "1111" to encode the bit value "1" and a code "0000" to encode the bit value "0", may result in long silence periods 625, e.g., longer than one SIFS, during packet transmission 620 of the wakeup packet.

Figure 7:
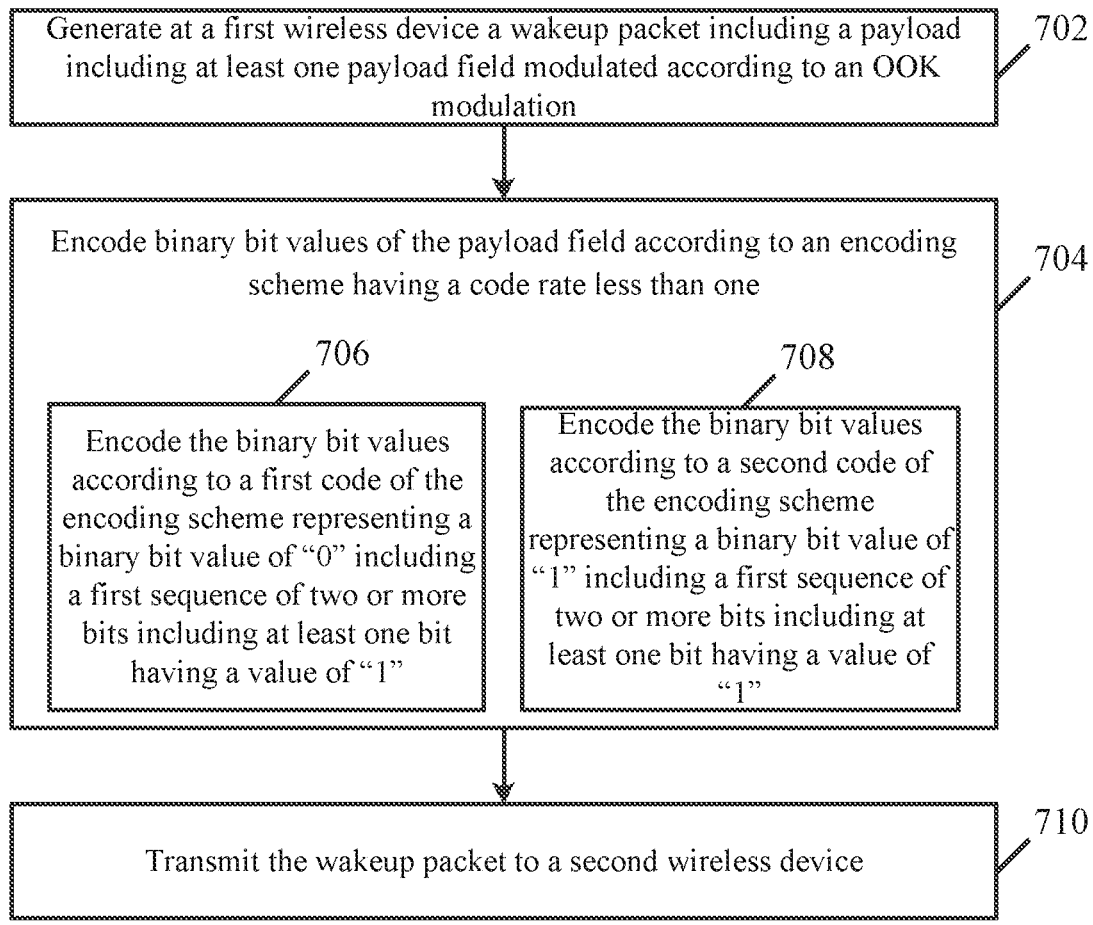
FIG. 7 is a schematic flow-chart illustration of a method of communicating a wakeup packet, in accordance with some demonstrative embodiments.

Reference is made to FIG. 7, which schematically illustrates a method of communicating a wakeup packet, in accordance with some demonstrative embodiments. For example, one or more of the operations of the method of FIG. 7 may be performed by one or more elements of a system, e.g., system 100 (FIG. 1), for example, one or more wireless devices, e.g., device 102 (FIG. 1) and/or device 140 (FIG. 1); a controller, e.g., controller 159 (FIG. 1), controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, receiver 156 and/or receiver 146 (FIG. 1); a wakeup receiver, e.g., wakeup receiver 150 (FIG. 1); and/or a message processor, e.g., message processor 157 (FIG. 1), message processor 128 (FIG. 1) and/or message processor 158 (FIG. 1).

As indicated at block 702, the method may include generating at a first wireless device a wakeup packet including a payload including at least one payload field modulated according to an OOK modulation. For example, controller 124 (FIG. 1) may control, cause and/or trigger device 102 (FIG. 1) to generate wakeup packet 130 (FIG. 1) including the payload including at least one payload field 230 (FIG. 2) modulated according to the OOK modulation, e.g., as described above.

As indicated at block 704, the method may include encoding binary bit values of the payload field according to an encoding scheme having a code rate less than one. For example, controller 124 (FIG. 1) may control, cause and/or trigger device 102 (FIG. 1) to encode the binary bit values of the payload field 230 (FIG. 2), according to the encoding scheme having the code rate less than one, e.g., as described above.

As indicated at block 706, encoding the binary bit values may include encoding the binary bit values according to a first code of the encoding scheme representing a binary bit value of "0" including a first sequence of two or more bits including at least one bit having a value of "1". For example, controller 124 (FIG. 1) may control, cause and/or trigger device 102 (FIG. 1) to encode the binary bit value of "0" according to the code "01" or the code "0101", e.g., as described above.

As indicated at block 708, encoding the binary bit values may include encoding the binary bit values according to a second code of the encoding scheme representing a binary bit value of "1" including a first sequence of two or more bits including at least one bit having a value of "1". For example, controller 124 (FIG. 1) may control, cause and/or trigger device 102 (FIG. 1) to encode the binary bit value of "1" according to the code "10" or the code "1010", e.g., as described above.

As indicated at block 710, the method may include transmitting the wakeup packet to a second wireless device. For example, controller 124 (FIG. 1) may control, cause and/or trigger device 102 (FIG. 1) to transmit wakeup packet 130 (FIG. 1) to device 140 (FIG. 1), e.g., as described above.

Figure 8:
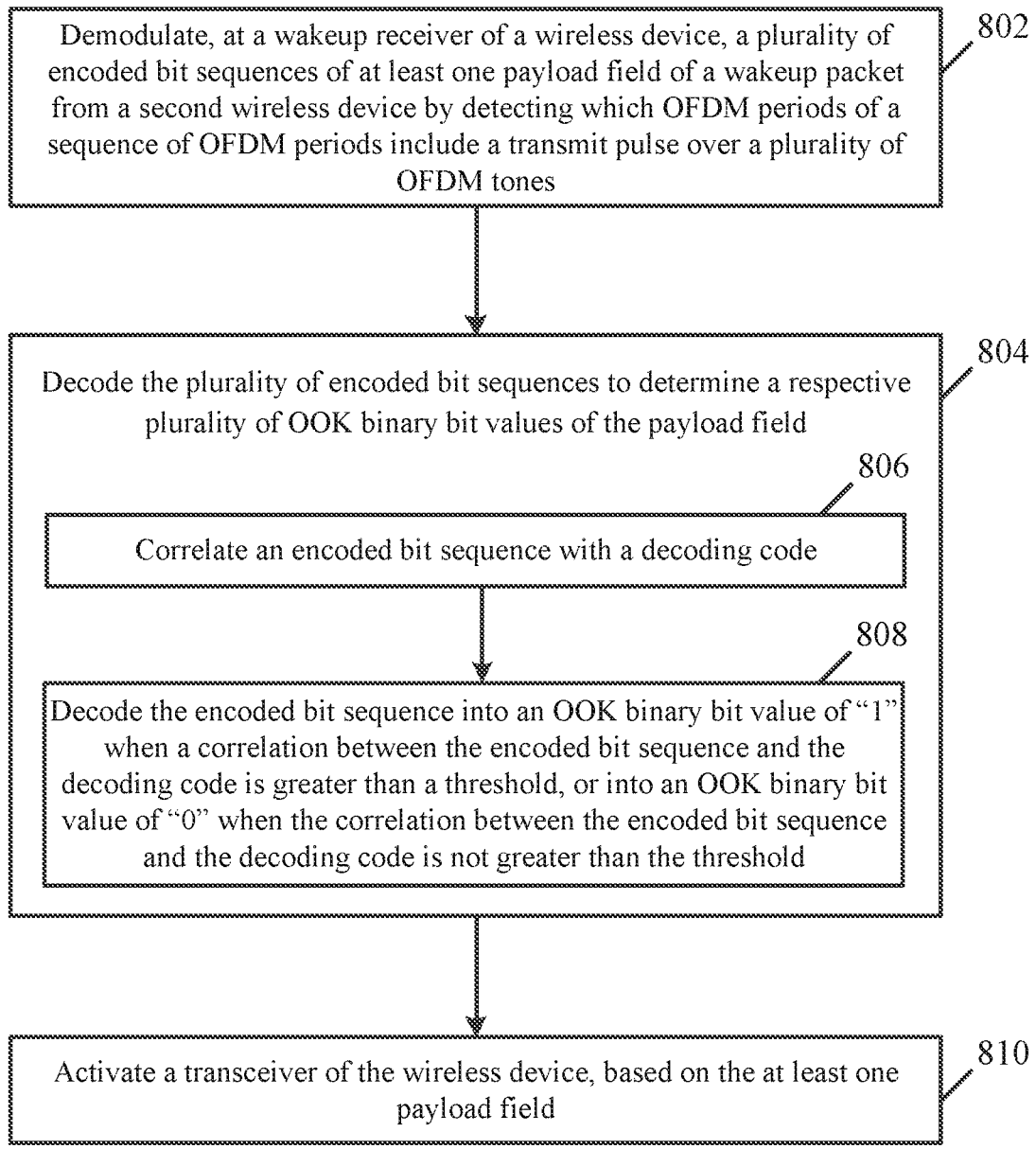
FIG. 8 is a schematic flow-chart illustration of a method of communicating a wakeup packet, in accordance with some demonstrative embodiments.

Reference is made to FIG. 8, which schematically illustrates a method of communicating a wakeup packet, in accordance with some demonstrative embodiments. For example, one or more of the operations of the method of FIG. 8 may be performed by one or more elements of a system, e.g., system 100 (FIG. 1), for example, one or more wireless devices, e.g., device 102 (FIG. 1) and/or device 140 (FIG. 1); a controller, e.g., controller 159 (FIG. 1), controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, receiver 156 and/or receiver 146 (FIG. 1); a wakeup receiver, e.g., wakeup receiver 150 (FIG. 1); and/or a message processor, e.g., message processor 157 (FIG. 1), message processor 128 (FIG. 1) and/or message processor 158 (FIG. 1).

As indicated at block 802, the method may include demodulating, at a wakeup receiver of a wireless device, a plurality of encoded bit sequences of at least one payload field of a wakeup packet from a second wireless device by detecting which OFDM periods of a sequence of OFDM periods include a transmit pulse over a plurality of OFDM tones. For example, wakeup receiver 150 (FIG. 1) may demodulate the plurality of encoded bit sequences of the payload field 230 (FIG. 2) of the wakeup packet 130 (FIG. 1) from device 102 (FIG. 1), for example, by detecting which OFDM periods of a sequence of OFDM periods include transmit pulse 400 (FIG. 4) over the plurality of OFDM tones, e.g., as described above.

As indicated at block 804, the method may include decoding the plurality of encoded bit sequences to determine a respective plurality of OOK binary bit values of the payload field. For example, wakeup receiver 150 (FIG. 1) may decode the plurality of encoded bit sequences to determine a respective plurality of OOK binary bit values of the payload field 230 (FIG. 2) of wakeup packet 130 (FIG. 1), e.g., as described above.

As indicated at block 806, decoding an encoded bit sequence of the plurality of encoded bit sequences may include correlating the encoded bit sequence with a decoding code. For example, wakeup receiver 150 (FIG. 1) may correlate the encoded bit sequence of the payload field 230 (FIG. 2) of the wakeup packet 130 (FIG. 1) with the decoding code "1 −1" or with the decoding code "1 −1 1 −1", e.g., as described above.

As indicated at block 808, decoding the plurality of encoded bit sequences may include decoding the encoded bit sequence into an OOK binary bit value of "1" when a correlation between the encoded bit sequence and the decoding code is greater than a threshold, or into an OOK binary bit value of "0" when the correlation between the encoded bit sequence and the decoding code is not greater than the threshold. For example, wakeup receiver 150 (FIG. 1) may decode the encoded bit sequence into an OOK binary bit value of "1" when a correlation between the encoded bit sequence and the decoding code is greater than a threshold, or into an OOK binary bit value of "0" when the correlation between the encoded bit sequence and the decoding code is not greater than the threshold, e.g., as described above.

As indicated at block 810, the method may include activating a transceiver of the first wireless device, based on the at least one payload field. For example, wakeup receiver 150 (FIG. 1) may activate radio 144 (FIG. 1), for example, based on the at least one payload field wakeup packet 130 (FIG. 1), e.g., as described above.

Figure 9:
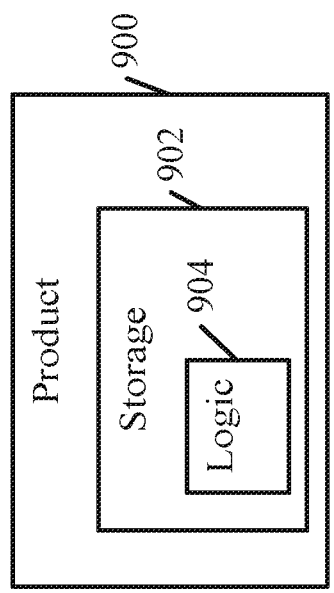
FIG. 9 is a schematic illustration of a product of manufacture, in accordance with some demonstrative embodiments.

Reference is made to FIG. 9, which schematically illustrates a product of manufacture 900, in accordance with some demonstrative embodiments. Product 900 may include one or more tangible computer-readable non-transitory storage media 902, which may include computer-executable instructions, e.g., implemented by logic 904, operable to, when executed by at least one computer processor, enable the at least one computer processor to implement one or more operations at device 102 (FIG. 1), device 140 (FIG. 1), radio 114 (FIG. 1), radio 144 (FIG. 1), wakeup receiver 150 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), message processor 128 (FIG. 1), and/or message processor 158 (FIG. 1), and/or to perform one or more operations of the method of FIGS. 1, 2, 3, 4, 5, 6A, 6B, 7 and/or 8, and/or one or more operations described herein. The phrase "non-transitory machine-readable medium" is directed to include all computer-readable media, with the sole exception being a transitory propagating signal.

In some demonstrative embodiments, product 900 and/or machine-readable storage medium 902 may include one or more types of computer-readable storage media capable of storing data, including volatile memory, non-volatile memory, removable or non-removable memory, erasable or non-erasable memory, writeable or re-writeable memory, and the like. For example, machine-readable storage medium 902 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 904 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 904 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising one or more processors comprising circuitry configured to cause a first wireless device to generate a wakeup packet comprising a payload comprising at least one payload field modulated according to an On-Off keying (OOK) modulation, the payload field comprising a sequence of a plurality of codes to encode binary bit values of the payload field according to an encoding scheme having a code rate less than one, a first code of the encoding scheme representing a binary bit value of "0" comprising a first sequence of two or more bits comprising at least one bit having a value of "1", and a second code of the encoding scheme representing a binary bit value of "1" comprising a second sequence of two or more bits comprising at least one bit having a value of "1"; and transmit the wakeup packet to a second wireless device.

Example 2 includes the subject matter of Example 1, and optionally, wherein the apparatus is configured to cause the first wireless device to modulate a preamble of the wakeup packet according to an Orthogonal Frequency Division Multiplexing (OFDM) scheme, and to modulate bits of the sequence of codes over a plurality of OFDM tones of the OFDM scheme.

Example 3 includes the subject matter of Example 2, and optionally, wherein the apparatus is configured to cause the first wireless device to generate a transmit pulse over the OFDM tones, and to modulate the bits of the sequence of codes by selectively transmitting the transmit pulse during one or more OFDM symbol periods.

Example 4 includes the subject matter of Example 3, and optionally, wherein the apparatus is configured to cause the first wireless device to select, based on a bit value of a bit of the bits of the sequence of codes, whether or not to transmit the transmit pulse over an OFDM symbol period.

Example 5 includes the subject matter of Example 4, and optionally, wherein the apparatus is configured to cause the first wireless device to select to transmit the transmit pulse over the OFDM symbol period to indicate a bit value of "1" and to select not to transmit the transmit pulse over the OFDM symbol period to indicate a bit value of "0".

Example 6 includes the subject matter of any one of Examples 1-5, and optionally, wherein the first code is orthogonal to the second code.

Example 7 includes the subject matter of any one of Examples 1-6, and optionally, wherein each of the first and second codes comprises no more than two consecutive zero bits.

Example 8 includes the subject matter of any one of Examples 1-7, and optionally, wherein each of the first and second codes comprises no consecutive zero bits.

Example 9 includes the subject matter of any one of Examples 1-8, and optionally, wherein the payload comprises a code rate field prior to the at least one payload field, the code rate field indicating the code rate.

Example 10 includes the subject matter of Example 9, and optionally, wherein the code-rate field is encoded with a code rate, which is a lowest of a code rate supported by the first wireless device and a code rate supported by the second wireless device.

Example 11 includes the subject matter of Example 9 or 10, and optionally, wherein the code-rate field is encoded with a code rate, which is lower than the code rate indicated by the code-rate field.

Example 12 includes the subject matter of any one of Examples 1-11, and optionally, wherein the code rate is 1/2.

Example 13 includes the subject matter of Example 12, and optionally, wherein one code of the first and second codes comprises a code "01", and another code of the first and second codes comprises a code "10".

Example 14 includes the subject matter of any one of Examples 1-11, and optionally, wherein the code rate is 1/4.

Example 15 includes the subject matter of Example 14, and optionally, wherein one code of the first and second codes comprises a code "0101", and another code of the first and second codes comprises a code "1010".

Example 16 includes the subject matter of any one of Examples 1-15, and optionally, comprising one or more antennas.

Example 17 includes the subject matter of any one of Examples 1-16, and optionally, comprising a radio, and a memory.

Example 18 includes a system of wireless communication comprising a first wireless device, the first wireless device comprising one or more antennas; a radio; a memory; and a controller configured to cause the first wireless device to generate a wakeup packet comprising a payload comprising at least one payload field modulated according to an On-Off keying (OOK) modulation, the payload field comprising a sequence of a plurality of codes to encode binary bit values of the payload field according to an encoding scheme having a code rate less than one, a first code of the encoding scheme representing a binary bit value of "0" comprising a first sequence of two or more bits comprising at least one bit having a value of "1", and a second code of the encoding scheme representing a binary bit value of "1" comprising a second sequence of two or more bits comprising at least one bit having a value of "1"; and transmit the wakeup packet to a second wireless device.

Example 19 includes the subject matter of Example 18, and optionally, wherein the first wireless device is to modulate a preamble of the wakeup packet according to an Orthogonal Frequency Division Multiplexing (OFDM) scheme, and to modulate bits of the sequence of codes over a plurality of OFDM tones of the OFDM scheme.

Example 20 includes the subject matter of Example 19, and optionally, wherein the first wireless device is to generate a transmit pulse over the OFDM tones, and to modulate the bits of the sequence of codes by selectively transmitting the transmit pulse during one or more OFDM symbol periods.

Example 21 includes the subject matter of Example 20, and optionally, wherein the first wireless device is to select, based on a bit value of a bit of the bits of the sequence of codes, whether or not to transmit the transmit pulse over an OFDM symbol period.

Example 22 includes the subject matter of Example 21, and optionally, wherein the first wireless device is to select to transmit the transmit pulse over the OFDM symbol period to indicate a bit value of "1" and to select not to transmit the transmit pulse over the OFDM symbol period to indicate a bit value of "0".

Example 23 includes the subject matter of any one of Examples 18-22, and optionally, wherein the first code is orthogonal to the second code.

Example 24 includes the subject matter of any one of Examples 18-23, and optionally, wherein each of the first and second codes comprises no more than two consecutive zero bits.

Example 25 includes the subject matter of any one of Examples 18-24, and optionally, wherein each of the first and second codes comprises no consecutive zero bits.

Example 26 includes the subject matter of any one of Examples 18-25, and optionally, wherein the payload comprises a code rate field prior to the at least one payload field, the code rate field indicating the code rate.

Example 27 includes the subject matter of Example 26, and optionally, wherein the code-rate field is encoded with a code rate, which is a lowest of a code rate supported by the first wireless device and a code rate supported by the second wireless device.

Example 28 includes the subject matter of Example 26 or 27, and optionally, wherein the code-rate field is encoded with a code rate, which is lower than the code rate indicated by the code-rate field.

Example 29 includes the subject matter of any one of Examples 18-28, and optionally, wherein the code rate is 1/2.

Example 30 includes the subject matter of Example 29, and optionally, wherein one code of the first and second codes comprises a code "01", and another code of the first and second codes comprises a code "10".

Example 31 includes the subject matter of any one of Examples 18-28, and optionally, wherein the code rate is 1/4.

Example 32 includes the subject matter of Example 31, and optionally, wherein one code of the first and second codes comprises a code "0101", and another code of the first and second codes comprises a code "1010".

Example 33 includes a method to be performed by a first wireless device, the method comprising generating a wakeup packet comprising a payload comprising at least one payload field modulated according to an On-Off keying (OOK) modulation, the payload field comprising a sequence of a plurality of codes to encode binary bit values of the payload field according to an encoding scheme having a code rate less than one, a first code of the encoding scheme representing a binary bit value of "0" comprising a first sequence of two or more bits comprising at least one bit having a value of "1", and a second code of the encoding scheme representing a binary bit value of "1" comprising a second sequence of two or more bits comprising at least one bit having a value of "1"; and transmitting the wakeup packet to a second wireless device.

Example 34 includes the subject matter of Example 33, and optionally, comprising modulating a preamble of the wakeup packet according to an Orthogonal Frequency Division Multiplexing (OFDM) scheme, and modulating bits of the sequence of codes over a plurality of OFDM tones of the OFDM scheme.

Example 35 includes the subject matter of Example 34, and optionally, comprising generating a transmit pulse over the OFDM tones, and modulating the bits of the sequence of codes by selectively transmitting the transmit pulse during one or more OFDM symbol periods.

Example 36 includes the subject matter of Example 35, and optionally, comprising selecting, based on a bit value of a bit of the bits of the sequence of codes, whether or not to transmit the transmit pulse over an OFDM symbol period.

Example 37 includes the subject matter of Example 36, and optionally, comprising selecting to transmit the transmit pulse over the OFDM symbol period to indicate a bit value of "1" and selecting not to transmit the transmit pulse over the OFDM symbol period to indicate a bit value of "0".

Example 38 includes the subject matter of any one of Examples 33-37, and optionally, wherein the first code is orthogonal to the second code.

Example 39 includes the subject matter of any one of Examples 33-38, and optionally, wherein each of the first and second codes comprises no more than two consecutive zero bits.

Example 40 includes the subject matter of any one of Examples 33-39, and optionally, wherein each of the first and second codes comprises no consecutive zero bits.

Example 41 includes the subject matter of any one of Examples 33-40, and optionally, wherein the payload comprises a code rate field prior to the at least one payload field, the code rate field indicating the code rate.

Example 42 includes the subject matter of Example 41, and optionally, wherein the code-rate field is encoded with a code rate, which is a lowest of a code rate supported by the first wireless device and a code rate supported by the second wireless device.

Example 43 includes the subject matter of Example 41 or 42, and optionally, wherein the code-rate field is encoded with a code rate, which is lower than the code rate indicated by the code-rate field.

Example 44 includes the subject matter of any one of Examples 33-43, and optionally, wherein the code rate is 1/2.

Example 45 includes the subject matter of Example 44, and optionally, wherein one code of the first and second codes comprises a code "01", and another code of the first and second codes comprises a code "10".

Example 46 includes the subject matter of any one of Examples 33-43, and optionally, wherein the code rate is 1/4.

Example 47 includes the subject matter of Example 46, and optionally, wherein one code of the first and second codes comprises a code "0101", and another code of the first and second codes comprises a code "1010".

Example 48 includes an product comprising one or more tangible computer-readable non-transitory storage media comprising computer-executable instructions operable to, when executed by at least one computer processor, enable the at least one computer processor to implement operations at a first wireless device, the operations comprising generating a wakeup packet comprising a payload comprising at least one payload field modulated according to an On-Off keying (OOK) modulation, the payload field comprising a sequence of a plurality of codes to encode binary bit values of the payload field according to an encoding scheme having a code rate less than one, a first code of the encoding scheme representing a binary bit value of "0" comprising a first sequence of two or more bits comprising at least one bit having a value of "1", and a second code of the encoding scheme representing a binary bit value of "1" comprising a second sequence of two or more bits comprising at least one bit having a value of "1"; and transmitting the wakeup packet to a second wireless device.

Example 49 includes the subject matter of Example 48, and optionally, wherein the operations comprise modulating a preamble of the wakeup packet according to an Orthogonal Frequency Division Multiplexing (OFDM) scheme, and modulating bits of the sequence of codes over a plurality of OFDM tones of the OFDM scheme.

Example 50 includes the subject matter of Example 49, and optionally, wherein the operations comprise generating a transmit pulse over the OFDM tones, and modulating the bits of the sequence of codes by selectively transmitting the transmit pulse during one or more OFDM symbol periods.

Example 51 includes the subject matter of Example 50, and optionally, wherein the operations comprise selecting, based on a bit value of a bit of the bits of the sequence of codes, whether or not to transmit the transmit pulse over an OFDM symbol period.

Example 52 includes the subject matter of Example 51, and optionally, wherein the operations comprise selecting to transmit the transmit pulse over the OFDM symbol period to indicate a bit value of "1" and selecting not to transmit the transmit pulse over the OFDM symbol period to indicate a bit value of "0".

Example 53 includes the subject matter of any one of Examples 48-52, and optionally, wherein the first code is orthogonal to the second code.

Example 54 includes the subject matter of any one of Examples 48-53, and optionally, wherein each of the first and second codes comprises no more than two consecutive zero bits.

Example 55 includes the subject matter of any one of Examples 48-54, and optionally, wherein each of the first and second codes comprises no consecutive zero bits.

Example 56 includes the subject matter of any one of Examples 48-55, and optionally, wherein the payload comprises a code rate field prior to the at least one payload field, the code rate field indicating the code rate.

Example 57 includes the subject matter of Example 56, and optionally, wherein the code-rate field is encoded with a code rate, which is a lowest of a code rate supported by the first wireless device and a code rate supported by the second wireless device.

Example 58 includes the subject matter of Example 56 or 57, and optionally, wherein the code-rate field is encoded with a code rate, which is lower than the code rate indicated by the code-rate field.

Example 59 includes the subject matter of any one of Examples 48-58, and optionally, wherein the code rate is 1/2.

Example 60 includes the subject matter of Example 59, and optionally, wherein one code of the first and second codes comprises a code "01", and another code of the first and second codes comprises a code "10".

Example 61 includes the subject matter of any one of Examples 48-58, and optionally, wherein the code rate is 1/4.

Example 62 includes the subject matter of Example 61, and optionally, wherein one code of the first and second codes comprises a code "0101", and another code of the first and second codes comprises a code "1010".

Example 63 includes an apparatus of wireless communication by a first wireless device, the apparatus comprising means for generating a wakeup packet comprising a payload comprising at least one payload field modulated according to an On-Off keying (OOK) modulation, the payload field comprising a sequence of a plurality of codes to encode binary bit values of the payload field according to an encoding scheme having a code rate less than one, a first code of the encoding scheme representing a binary bit value of "0" comprising a first sequence of two or more bits comprising at least one bit having a value of "1", and a second code of the encoding scheme representing a binary bit value of "1" comprising a second sequence of two or more bits comprising at least one bit having a value of "1"; and means for transmitting the wakeup packet to a second wireless device.

Example 64 includes the subject matter of Example 63, and optionally, comprising means for modulating a preamble of the wakeup packet according to an Orthogonal Frequency Division Multiplexing (OFDM) scheme, and modulating bits of the sequence of codes over a plurality of OFDM tones of the OFDM scheme.

Example 65 includes the subject matter of Example 64, and optionally, comprising means for generating a transmit pulse over the OFDM tones, and modulating the bits of the sequence of codes by selectively transmitting the transmit pulse during one or more OFDM symbol periods.

Example 66 includes the subject matter of Example 65, and optionally, comprising means for selecting, based on a bit value of a bit of the bits of the sequence of codes, whether or not to transmit the transmit pulse over an OFDM symbol period.

Example 67 includes the subject matter of Example 66, and optionally, comprising means for selecting to transmit the transmit pulse over the OFDM symbol period to indicate a bit value of "1" and selecting not to transmit the transmit pulse over the OFDM symbol period to indicate a bit value of "0".

Example 68 includes the subject matter of any one of Examples 63-67, and optionally, wherein the first code is orthogonal to the second code.

Example 69 includes the subject matter of any one of Examples 63-68, and optionally, wherein each of the first and second codes comprises no more than two consecutive zero bits.

Example 70 includes the subject matter of any one of Examples 63-69, and optionally, wherein each of the first and second codes comprises no consecutive zero bits.

Example 71 includes the subject matter of any one of Examples 63-70, and optionally, wherein the payload comprises a code rate field prior to the at least one payload field, the code rate field indicating the code rate.

Example 72 includes the subject matter of Example 71, and optionally, wherein the code-rate field is encoded with a code rate, which is a lowest of a code rate supported by the first wireless device and a code rate supported by the second wireless device.

Example 73 includes the subject matter of Example 71 or 72, and optionally, wherein the code-rate field is encoded with a code rate, which is lower than the code rate indicated by the code-rate field.

Example 74 includes the subject matter of any one of Examples 63-73, and optionally, wherein the code rate is 1/2.

Example 75 includes the subject matter of Example 74, and optionally, wherein one code of the first and second codes comprises a code "01", and another code of the first and second codes comprises a code "10".

Example 76 includes the subject matter of any one of Examples 63-73, and optionally, wherein the code rate is 1/4.

Example 77 includes the subject matter of Example 76, and optionally, wherein one code of the first and second codes comprises a code "0101", and another code of the first and second codes comprises a code "1010".

Example 78 includes an apparatus comprising one or more processors comprising circuitry configured to cause a first wireless device to demodulate, at a wakeup receiver of the first wireless device, a plurality of encoded bit sequences of at least one payload filed of a wakeup packet from a second wireless device by detecting which Orthogonal Frequency Division Multiplexing (OFDM) periods of a sequence of OFDM periods include a transmit pulse over a plurality of OFDM tones; decode the plurality of encoded bit sequences to determine a respective plurality of On-Off keying (OOK) binary bit values of the payload field, decoding an encoded bit sequence of the plurality of encoded bit sequences comprises correlating the encoded bit sequence with a decoding code; and based on the at least one payload field, activate a transceiver of the first wireless device.

Example 79 includes the subject matter of Example 78, and optionally, wherein the apparatus is configured to cause the first wireless device to determine a bit value of "1" corresponding to an OFDM symbol period when the transmit pulse is received during the OFDM symbol period, and to determine a bit value of "0" corresponding to the OFDM symbol period when the transmit pulse is not received during the OFDM symbol period.

Example 80 includes the subject matter of Example 78 or 79, and optionally, wherein the apparatus is configured to cause the first wireless device to decode the encoded bit sequence into an OOK binary bit value of "1" when a correlation between the encoded bit sequence and the decoding code is greater than a threshold, or into an OOK binary bit value of "0" when the correlation between the encoded bit sequence and the decoding code is not greater than the threshold.

Example 81 includes the subject matter of any one of Examples 78-80, and optionally, wherein a bit-length of the decoding code is equal to a bit-length of the encoded bit sequence.

Example 82 includes the subject matter of any one of Examples 78-81, and optionally, wherein the decoding code is based on a code rate of the encoded bit sequence.

Example 83 includes the subject matter of Example 82, and optionally, wherein the code rate is 1/4.

Example 84 includes the subject matter of Example 83, and optionally, wherein the decoding code comprises the code "1 −1 1 −1".

Example 85 includes the subject matter of Example 82, and optionally, wherein the code rate is 1/2.

Example 86 includes the subject matter of Example 85, and optionally, wherein the decoding code comprises the code "1 −1".

Example 87 includes the subject matter of any one of Examples 78-86, and optionally, wherein the apparatus is configured to cause the first wireless device to determine the decoding code based on a code rate filed of the wakeup packet.

Example 88 includes the subject matter of Example 87, and optionally, wherein the apparatus is configured to cause the first wireless device to decode the code rate field according to a predefined code.

Example 89 includes the subject matter of any one of Examples 78-88, and optionally, wherein the decoding code comprises only the values "1" and "−1".

Example 90 includes the subject matter of any one of Examples 78-89, and optionally, comprising the wakeup receiver and the transceiver.

Example 91 includes the subject matter of any one of Examples 78-90, and optionally, comprising one or more antennas.

Example 92 includes the subject matter of any one of Examples 78-91, and optionally, comprising one or more antennas.

Example 93 includes a system of wireless communication comprising a first wireless device, the first wireless device comprising demodulate, at a wakeup receiver of the first wireless device, a plurality of encoded bit sequences of at least one payload filed of a wakeup packet from a second wireless device by detecting which Orthogonal Frequency Division Multiplexing (OFDM) periods of a sequence of OFDM periods include a transmit pulse over a plurality of OFDM tones; decode the plurality of encoded bit sequences to determine a respective plurality of On-Off keying (OOK) binary bit values of the payload field, decoding an encoded bit sequence of the plurality of encoded bit sequences comprises correlating the encoded bit sequence with a decoding code; and based on the at least one payload field, activate a transceiver of the first wireless device.

Example 94 includes the subject matter of Example 93, and optionally, wherein the first wireless device is to determine a bit value of "1" corresponding to an OFDM symbol period when the transmit pulse is received during the OFDM symbol period, and to determine a bit value of "0" corresponding to the OFDM symbol period when the transmit pulse is not received during the OFDM symbol period.

Example 95 includes the subject matter of Example 93 or 94, and optionally, wherein the first wireless device is to decode the encoded bit sequence into an OOK binary bit value of "1" when a correlation between the encoded bit sequence and the decoding code is greater than a threshold, or into an OOK binary bit value of "0" when the correlation between the encoded bit sequence and the decoding code is not greater than the threshold.

Example 96 includes the subject matter of any one of Examples 93-95, and optionally, wherein a bit-length of the decoding code is equal to a bit-length of the encoded bit sequence.

Example 97 includes the subject matter of any one of Examples 93-96, and optionally, wherein the decoding code is based on a code rate of the encoded bit sequence.

Example 98 includes the subject matter of Example 97, and optionally, wherein the code rate is 1/4.

Example 99 includes the subject matter of Example 98, and optionally, wherein the decoding code comprises the code "1 −1 1 −1".

Example 100 includes the subject matter of Example 97, and optionally, wherein the code rate is 1/2.

Example 101 includes the subject matter of Example 100, and optionally, wherein the decoding code comprises the code "1 −1".

Example 102 includes the subject matter of any one of Examples 93-101, and optionally, wherein the first wireless device is to determine the decoding code based on a code rate filed of the wakeup packet.

Example 103 includes the subject matter of Example 102, and optionally, wherein the first wireless device is to decode the code rate field according to a predefined code.

Example 104 includes the subject matter of any one of Examples 93-103, and optionally, wherein the decoding code comprises only the values "1" and "−1".

Example 105 includes the subject matter of any one of Examples 93-104, and optionally, wherein the first wireless device comprises the wakeup receiver and the transceiver.

Example 106 includes a method to be performed by a first wireless device, the method comprising demodulating, at a wakeup receiver of the first wireless device, a plurality of encoded bit sequences of at least one payload filed of a wakeup packet from a second wireless device by detecting which Orthogonal Frequency Division Multiplexing (OFDM) periods of a sequence of OFDM periods include a transmit pulse over a plurality of OFDM tones; decoding the plurality of encoded bit sequences to determine a respective plurality of On-Off keying (OOK) binary bit values of the payload field, decoding an encoded bit sequence of the plurality of encoded bit sequences comprises correlating the encoded bit sequence with a decoding code; and based on the at least one payload field, activating a transceiver of the first wireless device.

Example 107 includes the subject matter of Example 106, and optionally, comprising determining a bit value of "1" corresponding to an OFDM symbol period when the transmit pulse is received during the OFDM symbol period, and determining a bit value of "0" corresponding to the OFDM symbol period when the transmit pulse is not received during the OFDM symbol period.

Example 108 includes the subject matter of Example 106 or 107, and optionally, comprising decoding the encoded bit sequence into an OOK binary bit value of "1" when a correlation between the encoded bit sequence and the decoding code is greater than a threshold, or into an OOK binary bit value of "0" when the correlation between the encoded bit sequence and the decoding code is not greater than the threshold.

Example 109 includes the subject matter of any one of Examples 106-108, and optionally, wherein a bit-length of the decoding code is equal to a bit-length of the encoded bit sequence.

Example 110 includes the subject matter of any one of Examples 106-109, and optionally, wherein the decoding code is based on a code rate of the encoded bit sequence.

Example 111 includes the subject matter of Example 110, and optionally, wherein the code rate is 1/4.

Example 112 includes the subject matter of Example 111, and optionally, wherein the decoding code comprises the code "1 −1 1 −1".

Example 113 includes the subject matter of Example 110, and optionally, wherein the code rate is 1/2.

Example 114 includes the subject matter of Example 113, and optionally, wherein the decoding code comprises the code "1 −1".

Example 115 includes the subject matter of any one of Examples 106-114, and optionally, comprising determining the decoding code based on a code rate filed of the wakeup packet.

Example 116 includes the subject matter of Example 115, and optionally, comprising decoding the code rate field according to a predefined code.

Example 117 includes the subject matter of any one of Examples 106-116, and optionally, wherein the decoding code comprises only the values "1" and "−1".

Example 118 includes a product comprising one or more tangible computer-readable non-transitory storage media comprising computer-executable instructions operable to, when executed by at least one computer processor, enable the at least one computer processor to implement operations at a first wireless device, the operations comprising demodulating, at a wakeup receiver of the first wireless device, a plurality of encoded bit sequences of at least one payload filed of a wakeup packet from a second wireless device by detecting which Orthogonal Frequency Division Multiplexing (OFDM) periods of a sequence of OFDM periods include a transmit pulse over a plurality of OFDM tones; decoding the plurality of encoded bit sequences to determine a respective plurality of On-Off keying (OOK) binary bit values of the payload field, decoding an encoded bit sequence of the plurality of encoded bit sequences comprises correlating the encoded bit sequence with a decoding code; and based on the at least one payload field, activating a transceiver of the first wireless device.

Example 119 includes the subject matter of Example 118, and optionally, wherein the operations comprise determining a bit value of "1" corresponding to an OFDM symbol period when the transmit pulse is received during the OFDM symbol period, and determining a bit value of "0" corresponding to the OFDM symbol period when the transmit pulse is not received during the OFDM symbol period.

Example 120 includes the subject matter of Example 118 or 119, and optionally, wherein the operations comprise decoding the encoded bit sequence into an OOK binary bit value of "1" when a correlation between the encoded bit sequence and the decoding code is greater than a threshold, or into an OOK binary bit value of "0" when the correlation between the encoded bit sequence and the decoding code is not greater than the threshold.

Example 121 includes the subject matter of any one of Examples 118-120, and optionally, wherein a bit-length of the decoding code is equal to a bit-length of the encoded bit sequence.

Example 122 includes the subject matter of any one of Examples 118-121, and optionally, wherein the decoding code is based on a code rate of the encoded bit sequence.

Example 123 includes the subject matter of Example 122, and optionally, wherein the code rate is 1/4.

Example 124 includes the subject matter of Example 123, and optionally, wherein the decoding code comprises the code "1 −1 1 −1".

Example 125 includes the subject matter of Example 122, and optionally, wherein the code rate is 1/2.

Example 126 includes the subject matter of Example 125, and optionally, wherein the decoding code comprises the code "1 −1".

Example 127 includes the subject matter of any one of Examples 118-126, and optionally, wherein the operations comprise determining the decoding code based on a code rate filed of the wakeup packet.

Example 128 includes the subject matter of Example 127, and optionally, wherein the operations comprise decoding the code rate field according to a predefined code.

Example 129 includes the subject matter of any one of Examples 118-128, and optionally, wherein the decoding code comprises only the values "1" and "−1".

Example 130 includes an apparatus of wireless communication by a first wireless device, the apparatus comprising means for demodulating, at a wakeup receiver of the first wireless device, a plurality of encoded bit sequences of at least one payload filed of a wakeup packet from a second wireless device by detecting which Orthogonal Frequency Division Multiplexing (OFDM) periods of a sequence of OFDM periods include a transmit pulse over a plurality of OFDM tones; means for decoding the plurality of encoded bit sequences to determine a respective plurality of On-Off keying (OOK) binary bit values of the payload field, decoding an encoded bit sequence of the plurality of encoded bit sequences comprises correlating the encoded bit sequence with a decoding code; and means for, based on the at least one payload field, activating a transceiver of the first wireless device.

Example 131 includes the subject matter of Example 130, and optionally, comprising means for determining a bit value of "1" corresponding to an OFDM symbol period when the transmit pulse is received during the OFDM symbol period, and determining a bit value of "0" corresponding to the OFDM symbol period when the transmit pulse is not received during the OFDM symbol period.

Example 132 includes the subject matter of Example 130 or 131, and optionally, comprising means for decoding the encoded bit sequence into an OOK binary bit value of "1" when a correlation between the encoded bit sequence and the decoding code is greater than a threshold, or into an OOK binary bit value of "0" when the correlation between the encoded bit sequence and the decoding code is not greater than the threshold.

Example 133 includes the subject matter of any one of Examples 130-132, and optionally, wherein a bit-length of the decoding code is equal to a bit-length of the encoded bit sequence.

Example 134 includes the subject matter of any one of Examples 130-133, and optionally, wherein the decoding code is based on a code rate of the encoded bit sequence.

Example 135 includes the subject matter of Example 134, and optionally, wherein the code rate is 1/4.

Example 136 includes the subject matter of Example 135, and optionally, wherein the decoding code comprises the code "1 −1 1 −1".

Example 137 includes the subject matter of Example 134, and optionally, wherein the code rate is 1/2.

Example 138 includes the subject matter of Example 137, and optionally, wherein the decoding code comprises the code "1 −1".

Example 139 includes the subject matter of any one of Examples 130-138, and optionally, comprising means for determining the decoding code based on a code rate filed of the wakeup packet.

Example 140 includes the subject matter of Example 139, and optionally, comprising means for decoding the code rate field according to a predefined code.

Example 141 includes the subject matter of any one of Examples 130-140, and optionally, wherein the decoding code comprises only the values "1" and "−1".

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising one or more processors comprising circuitry configured to cause a first wireless device to:
generate a wakeup packet comprising a payload comprising at least one payload field modulated according to an On-Off keying (OOK) modulation, the payload field comprising a sequence of a plurality of codes to encode binary bit values of the payload field according to an encoding scheme having a code rate less than one, a first code of the encoding scheme representing a binary bit value of "0" comprising a first sequence of two or more bits comprising at least one bit having a value of "1", and a second code of the encoding scheme representing a binary bit value of "1" comprising a second sequence of two or more bits comprising at least one bit having a value of "1", the wakeup packet comprising a field prior to the payload field to indicate the code rate of the encoding scheme; and
transmit the wakeup packet to a second wireless device.

2. The apparatus of claim 1 configured to cause the first wireless device to modulate a preamble of the wakeup packet according to an Orthogonal Frequency Division Multiplexing (OFDM) scheme, and to modulate bits of the sequence of codes over a plurality of OFDM tones of the OFDM scheme.

3. The apparatus of claim 2 configured to cause the first wireless device to generate a transmit pulse over the OFDM tones, and to modulate the bits of the sequence of codes by selectively transmitting the transmit pulse during one or more OFDM symbol periods.

4. The apparatus of claim 3 configured to cause the first wireless device to select, based on a bit value of a bit of the bits of the sequence of codes, whether or not to transmit the transmit pulse over an OFDM symbol period.

5. The apparatus of claim 1, wherein the first code is orthogonal to the second code.

6. The apparatus of claim 1, wherein each of the first and second codes comprises no more than two consecutive zero bits.

7. The apparatus of claim 1, wherein the code rate is 1/2.

8. The apparatus of claim 7, wherein one code of the first and second codes comprises a code "01", and another code of the first and second codes comprises a code "10".

9. The apparatus of claim 1, wherein the code rate is 1/4.

10. The apparatus of claim 9, wherein one code of the first and second codes comprises a code "0101", and another code of the first and second codes comprises a code "1010".

11. The apparatus of claim 1 comprising one or more antennas.

12. A product comprising one or more tangible computer-readable non-transitory storage media comprising computer-executable instructions operable to, when executed by at least one processor, enable the at least one processor to cause a first wireless device to:
generate a wakeup packet comprising a payload comprising at least one payload field modulated according to an On-Off keying (OOK) modulation, the payload field comprising a sequence of a plurality of codes to encode binary bit values of the payload field according to an encoding scheme having a code rate less than one, a first code of the encoding scheme representing a binary bit value of "0" comprising a first sequence of two or more bits comprising at least one bit having a value of "1", and a second code of the encoding scheme representing a binary bit value of "1" comprising a second sequence of two or more bits comprising at least one bit having a value of "1", the wakeup packet comprising a field prior to the payload field to indicate the code rate of the encoding scheme; and
transmit the wakeup packet to a second wireless device.

13. The product of claim 12, wherein the first code is orthogonal to the second code.

14. An apparatus comprising one or more processors comprising circuitry configured to cause a first wireless device to:

demodulate, at a wakeup receiver of the first wireless device, a plurality of encoded bit sequences of at least one payload field of a wakeup packet from a second wireless device by detecting which Orthogonal Frequency Division Multiplexing (OFDM) periods of a sequence of OFDM periods include a transmit pulse over a plurality of OFDM tones;

determine a decoding code based on a field of the wakeup packet;

decode the plurality of encoded bit sequences to determine a respective plurality of On-Off keying (OOK) binary bit values of the payload field, decoding an encoded bit sequence of said plurality of encoded bit sequences comprises correlating the encoded bit sequence with the decoding code; and based on the at least one payload field, activate a transceiver of the first wireless device.

15. The apparatus of claim 14 configured to cause the first wireless device to decode the encoded bit sequence into an OOK binary bit value of "1" when a correlation between the encoded bit sequence and the decoding code is greater than a threshold, or into an OOK binary bit value of "0" when the correlation between the encoded bit sequence and the decoding code is not greater than the threshold.

16. The apparatus of claim 14, wherein the decoding code is based on a code rate of the encoded bit sequence.

17. The apparatus of claim 16, wherein the code rate is 1/4.

18. The apparatus of claim 17, wherein the decoding code comprises the code "1 −1 1 −1".

19. The apparatus of claim 16, wherein the code rate is 1/2.

20. The apparatus of claim 19, wherein the decoding code comprises the code "1 −1".

21. The apparatus of claim 14, wherein the decoding code comprises only the values "1" and "−1".

22. A product comprising one or more tangible computer-readable non-transitory storage media comprising computer-executable instructions operable to, when executed by at least one processor, enable the at least one processor to cause a first wireless device to:

demodulate, at a wakeup receiver of the first wireless device, a plurality of encoded bit sequences of at least one payload field of a wakeup packet from a second wireless device by detecting which Orthogonal Frequency Division Multiplexing (OFDM) periods of a sequence of OFDM periods include a transmit pulse over a plurality of OFDM tones;

decode the plurality of encoded bit sequences to determine a respective plurality of On-Off keying (OOK) binary bit values of the payload field, decoding an encoded bit sequence of said plurality of encoded bit sequences comprises correlating the encoded bit sequence with a decoding code by decoding the encoded bit sequence into an OOK binary bit value of "1" when a correlation between the encoded bit sequence and the decoding code is greater than a threshold, or into an OOK binary bit value of "0" when the correlation between the encoded bit sequence and the decoding code is not greater than the threshold; and based on the at least one payload field, activate a transceiver of the first wireless device.

23. The product of claim 22, wherein the decoding code is based on a code rate of the encoded bit sequence.

24. The product of claim 22, wherein the instructions, when executed, cause the first wireless device to determine the decoding code based on a field of the wakeup packet.

* * * * *